United States Patent
Noh et al.

(10) Patent No.: US 8,958,488 B2
(45) Date of Patent: Feb. 17, 2015

(54) REFERENCE SIGNAL TRANSMITTING METHOD AND DEVICE IN A MULTI-ANTENNA SYSTEM

(75) Inventors: Min Seok Noh, Anyang-si (KR); Jae Hoon Chung, Anyang-si (KR); Yeong Hyeon Kwon, Anyang-si (KR); Hyun Soo Ko, Anyang-si (KR); Seung Hee Han, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 587 days.

(21) Appl. No.: 13/319,957

(22) PCT Filed: May 11, 2010

(86) PCT No.: PCT/KR2010/002988
§ 371 (c)(1),
(2), (4) Date: Dec. 16, 2011

(87) PCT Pub. No.: WO2010/131890
PCT Pub. Date: Nov. 18, 2010

(65) Prior Publication Data
US 2012/0087427 A1 Apr. 12, 2012

Related U.S. Application Data

(60) Provisional application No. 61/176,948, filed on May 11, 2009, provisional application No. 61/178,027, filed on May 13, 2009.

(51) Int. Cl.
*H04L 27/28* (2006.01)
*H04B 7/06* (2006.01)
(Continued)

(52) U.S. Cl.
CPC ............ *H04B 7/0613* (2013.01); *H04B 7/0684* (2013.01); *H04J 13/16* (2013.01); *H04L 5/0048* (2013.01); *H04L 27/261* (2013.01); *H04J 13/0074* (2013.01); *H04L 25/022* (2013.01)
USPC ............................ 375/260; 375/259; 375/267

(58) Field of Classification Search
CPC ...................................... H04L 27/261
USPC ........................................ 375/260, 259, 267
See application file for complete search history.

(56) References Cited

U.S. PATENT DOCUMENTS 8,432,979 B2 * 4/2013 Tiirola et al. ................. 375/260
2008/0318608 A1 12/2008 Inoue et al.
(Continued)

FOREIGN PATENT DOCUMENTS

| CN | 101192875 A | 6/2008 |
| CN | 101330321 A | 12/2008 |

(Continued)

OTHER PUBLICATIONS

LG Electronics Inc., "Consideration on DMRS Design for UL SU-MIMO in LTE-A," 3GPP TSG RAN WG1 Meeting #56bis, Agenda Item 15.5, R1-091214, Mar. 23-27, 2009, Seoul, Republic of Korea, 5 pages.
(Continued)

*Primary Examiner* — Michael Neff
(74) *Attorney, Agent, or Firm* — Birch, Stewart, Kolasch & Birch, LLP

(57) ABSTRACT

Provided are a reference signal transmitting method and device in a multi-antenna system. A terminal generates a plurality of reference signal sequences to which different cyclic shift values are allocated, respectively, generates an orthogonal frequency division multiplexing (OFDM) symbol to which the plurality of reference signal sequences are mapped, and transmits the OFDM symbol to a base station through a plurality of antennas. Each cyclic shift value allocated to each reference signal sequence is determined on the basis of a parameter n indicated by a cyclic shift field transmitted from a physical downlink control channel (PDCCH).

32 Claims, 14 Drawing Sheets

(51) Int. Cl.
  *H04J 13/16* (2011.01)
  *H04L 5/00* (2006.01)
  *H04L 27/26* (2006.01)
  *H04J 13/00* (2011.01)
  *H04L 25/02* (2006.01)

(56) References Cited

U.S. PATENT DOCUMENTS

| | | | |
|---|---|---|---|
| 2009/0238121 A1* | 9/2009 | Kotecha | 370/329 |
| 2009/0262856 A1* | 10/2009 | Onggosanusi et al. | 375/267 |
| 2010/0142475 A1 | 6/2010 | Kim et al. | |
| 2011/0299625 A1 | 12/2011 | Hooli et al. | |

FOREIGN PATENT DOCUMENTS

| | | |
|---|---|---|
| JP | 2010-541308 A | 12/2010 |
| JP | 2012-518960 A | 8/2012 |
| WO | WO 2007/127902 A2 | 11/2007 |
| WO | WO 2008/132073 A1 | 11/2008 |

OTHER PUBLICATIONS

Motorola et al., "Clarification on PUSCH DM RS Cyclic Shift Hopping," 3GPP TSG-RAN WG1 Meeting #54, Change Request 36.211 CR 0089, Version 8.4.0, R1-083927, Sep. 29-Oct. 3, 2008, Prague, Czech Republic, 2 pages.

Texas Instruments, "Discussion on UL DM RS for SU-MIMO," 3GPP TSG RAN WG1 #57, Agenda Item 15.5, R1-091843, May 4-8, 2009, San Francisco, California, USA, 3 pages.

Motorola, "E-UTRA Uplink DM RS Issues," Agenda Item: 6.2.2, 3GPP TSG RAN1#51, R1-074573, Nov. 5-9, 2007, pp. 1-8.

Motorola, "Hopping Patterns for UL RS," Agenda Item: 6.1.2, 3GPP TSG RAN1#52, R1-080719, Feb. 11-15, 2008, pp. 1-7.

Nokia Siemens Networks et al., "Cyclic shift value definition for PUSCH demodulation RS," 3GPP TSG RAN WG1 Meeting #52bis, Mar. 31-Apr. 4, 2008, 2 pages total, R1-081444.

Texas Instruments et al., "On Remaining Issues of PUCCH Slot Based CS/OC Remapping," 3GPP TSG RAN WG1 #52bis, Mar. 31-Apr. 4, 2008, pp. 1-5, R1-081374.

* cited by examiner

FIG. 5
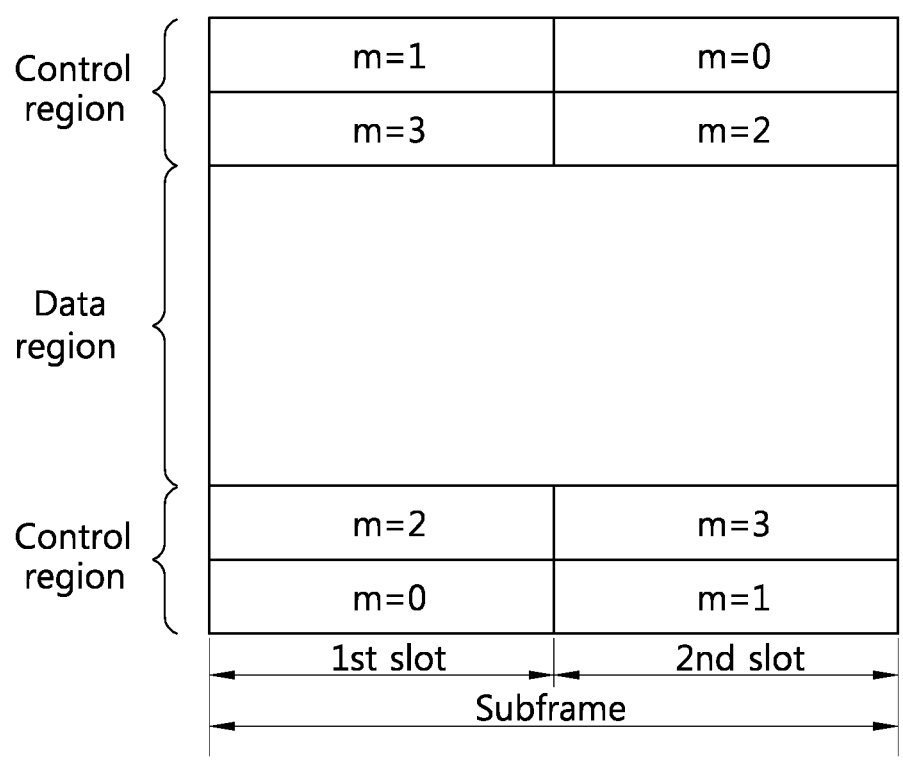
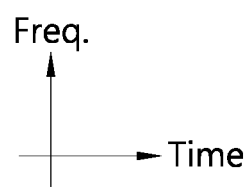

FIG. 7
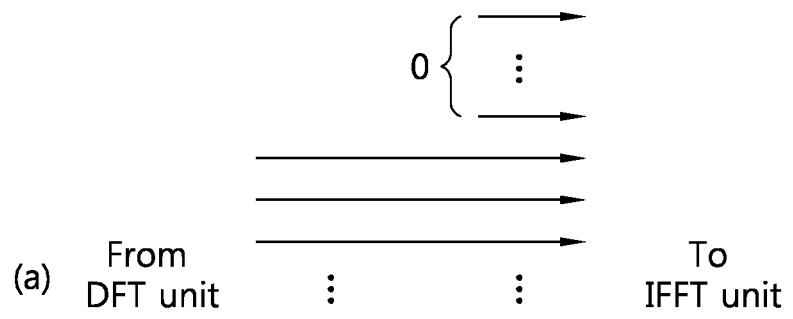
(a)
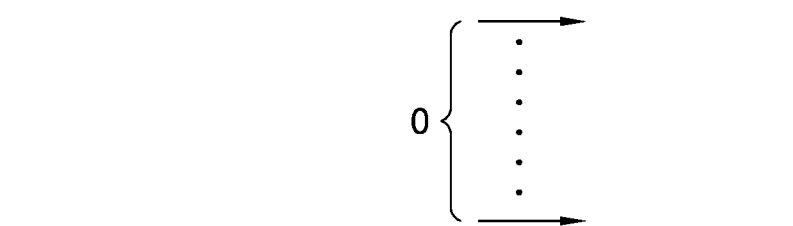
(b)

FIG. 9
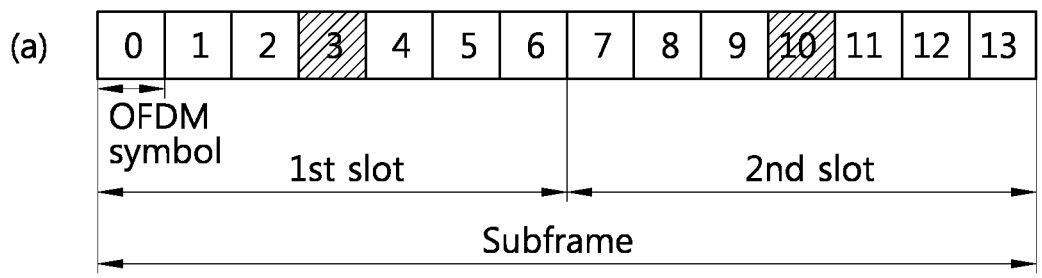
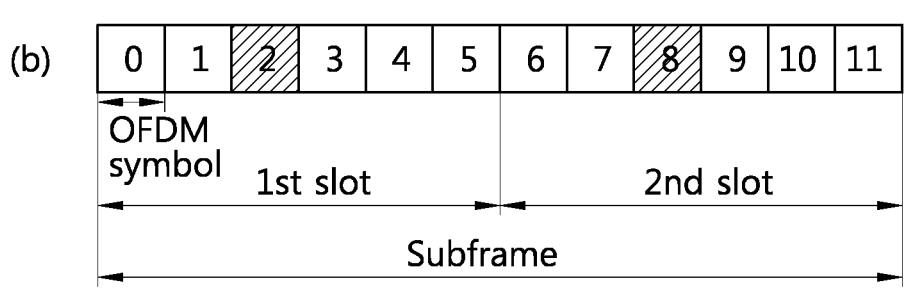

REFERENCE SIGNAL TRANSMITTING METHOD AND DEVICE IN A MULTI-ANTENNA SYSTEM

CROSS-REFERENCE TO RELATED APPLICATIONS

This application claims the benefit of priority of U.S. Provisional application No. 61/176,948 filed on May 11, 2009, and U.S. Provisional application No. 61/178,027 filed on May 13, 2009, all of which are incorporated by reference in their entirety herein.

BACKGROUND OF THE INVENTION

1. Field of the Invention

The present invention relates to wireless communication, and more particularly, to a method and apparatus for transmitting a reference signal in a multi-antenna system.

2. Related Art

Effective transmission/reception methods and utilizations have been proposed for a broadband wireless communication system to maximize efficiency of radio resources. An orthogonal frequency division multiplexing (OFDM) system capable of reducing inter-symbol interference (NI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference.

When a system uses the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner. In an OFDMA system, frequency diversity for multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain.

Meanwhile, in OFDM/OFDMA systems, a peak-to-average power ratio (PAPR) and a cubic metric (CM) may be increased. The PAPR means a ratio of a maximum transmission power and an average transmission power. According to an increase of the PAPR, the capacity of a power amplifier must be increased. It results from the fact that an OFDM symbol is the overlapping of N sinusoidal signals on different subcarriers. To lower the PAPR acts as an important problem in a user equipment (UE) because it is necessary to reduce the capacity of the battery in the UE as possible.

In order to lower the PAPR, a single carrier frequency division multiple access (SC-FDMA) scheme may be proposed. SC-FDMA is of a form in which frequency division multiple access (FDMA) is incorporated into a single carrier frequency division equalization (SC-FDE) scheme. SC-FDMA has a similar characteristic to OFDMA in that data is modulated and demodulated in the time domain and the frequency domain by using a discrete Fourier transform (DFT), but is advantageous in reducing transmission power because the PAPR of a transmission signal is low. In particular, SC-FDMA may be said to be suitable for uplink communication from a UE, sensitive to transmission power, to a BS in relation to the use of the battery. Furthermore, an SC-FDMA system makes small a change of a signal and thus has a wide coverage as compared with other systems when the same power amplifier is used.

A multiple-in multiple-out (MIMO) technology can be used to improve the efficiency of data transmission and reception using multiple transmission antennas and multiple reception antennas. Schemes to implement diversity in MIMO system includes a space frequency block code (SFBC), a space time block code (STBC), a cyclic delay diversity (CDD), a frequency switched transmit diversity (FSTD), a time switched transmit diversity (TSTD), a precoding vector switching (PVS), a spatial multiplexing (SM), and the like. An MIMO channel matrix according to the number of reception antennas and the number of transmission antennas can be decomposed into a number of independent channels. Each of the independent channels is called a layer or stream. The number of layers is called a rank.

In wireless communication systems, it is necessary to estimate an uplink channel or a downlink channel for the purpose of the transmission and reception of data, the acquisition of system synchronization, and the feedback of channel information. In wireless communication system environments, fading is generated because of multi-path time latency. A process of restoring a transmit signal by compensating for the distortion of the signal resulting from a sudden change in the environment due to such fading is referred to as channel estimation. It is also necessary to measure the state of a channel for a cell to which a user equipment belongs or other cells. To estimate a channel or measure the state of a channel, a reference signal (RS) which is known to both a transmitter and a receiver can be used.

A subcarrier used to transmit the reference signal is referred to as a reference signal subcarrier, and a subcarrier used to transmit data is referred to as a data subcarrier. In an OFDM system, a method of assigning the reference signal includes a method of assigning the reference signal to all the subcarriers and a method of assigning the reference signal between data subcarriers. The method of assigning the reference signal to all the subcarriers is performed using a signal including only the reference signal, such as a preamble signal, in order to obtain the throughput of channel estimation. If this method is used, the performance of channel estimation can be improved as compared with the method of assigning the reference signal between data subcarriers because the density of reference signals is in general high. However, since the amount of transmitted data is small in the method of assigning the reference signal to all the subcarriers, the method of assigning the reference signal between data subcarriers is used in order to increase the amount of transmitted data. If the method of assigning the reference signal between data subcarriers is used, the performance of channel estimation can be deteriorated because the density of reference signals is low. Accordingly, the reference signals should be properly arranged in order to minimize such deterioration.

A receiver can estimate a channel by separating information about a reference signal from a received signal because it knows the information about a reference signal and can accurately estimate data, transmitted by a transmit stage, by compensating for an estimated channel value. Assuming that the reference signal transmitted by the transmitter is p, channel information experienced by the reference signal during transmission is h, thermal noise occurring in the receiver is n, and the signal received by the receiver is y, it can result in y=h·p+n. Here, since the receiver already knows the reference signal p, it can estimate a channel information value ĥ using Equation 1 in the case in which a Least Square (LS) method is used.

$$\hat{h}=y/p=h+n/p=h+n \qquad \text{[Equation 1]}$$

The accuracy of the channel estimation value ĥ estimated using the reference signal p is determined by the value ñ. To accurately estimate the value h, the value ñ must converge on 0. To this end, the influence of the value ñ has to be minimized by estimating a channel using a large number of reference signals. A variety of algorithms for a better channel estimation performance may exist.

Meanwhile, in a current LTE system, there have not yet been proposed a method of transmitting a reference signal, which supports a MIMO system using a plurality of antennas in UL transmission, and a method of allocating the cyclic shift values of a reference signal sequence according to the above method. Accordingly, in MIMO systems, there is a need for a method of transmitting a reference signal which guarantees the performance of channel estimation.

SUMMARY OF THE INVENTION

The present invention provides a method and apparatus for transmitting a reference signal in a wireless communication system.

In an aspect, a method of transmitting a reference signal in a multi-antenna system is provided. The method includes generating a plurality of reference signal sequences to which different cyclic shift values are respectively allocated, generating an orthogonal frequency division multiplexing (OFDM) symbol to which the plurality of reference signal sequences is mapped, and transmitting the OFDM symbol to a base station through a plurality of antennas, wherein the each cyclic shift value allocated to each of the plurality of reference signal sequences is determined based on a parameter n indicated by a cyclic shift field transmitted through a physical downlink control channel (PDCCH). Each of the plurality of reference signal sequences may be a reference signal sequence for a different layer. The each cyclic shift value allocated to each of the plurality of reference signal sequences may be determined based on a value indicated by a rank indicator (RI). The each cyclic shift value allocated to each of the plurality of reference signal sequences may be determined so that an interval between the cyclic shift values becomes a maximum based on the parameter n. The each cyclic shift value allocated to each of the plurality of reference signal sequences may be determined by a specific Equation. A number of layers may be one of 2, 3, and 4. The each cyclic shift value allocated to each of the plurality of reference signal sequences may be determined at an interval of an offset constantly fixed based on the parameter n. The each cyclic shift value allocated to each of the plurality of reference signal sequences may be transmitted by a higher layer based on the parameter n, and may be determined by an offset of a cyclic shift index corresponding to the parameter n in a one-to-one way. A number of the plurality of antennas may be one of 2, 3, and 4. The OFDM symbol to which the plurality of reference signal sequences may be mapped is a fourth OFDM symbol (OFDM symbol index 3) in a slot including 7 OFDM. The OFDM symbol to which the plurality of reference signal sequences may be mapped is a third OFDM symbol (OFDM symbol index 2) in a slot including 6 OFDM.

In another aspect, an apparatus for transmitting a reference signal in a multi-antenna system is provided. The apparatus includes a reference signal generation unit configured for generating a plurality of reference signal sequences to which different cyclic shift values are respectively allocated, an orthogonal frequency division multiplexing (OFDM) symbol generation unit coupled to the reference signal generation unit and configured for generating an OFDM symbol to which the plurality of reference signal sequences is mapped, and a radio frequency (RF) unit coupled to the OFDM symbol generation unit and configured for transmitting the OFDM symbol to a base station through a plurality of antennas, wherein the each cyclic shift value allocated to each of the plurality of reference signal sequences is determined based on a parameter n indicated by a cyclic shift field transmitted through a physical downlink control channel (PDCCH). The each cyclic shift value allocated to each of the plurality of reference signal sequences may be determined based on a value indicated by a rank indicator (RI).

System performance can be improved because the multiplexing of a reference signal is possible and robust frequency selective channel estimation is possible in a multi-antenna system.

BRIEF DESCRIPTION OF THE DRAWINGS

FIG. 5 shows the structure of an uplink subframe.

FIG. 7 shows an example of a scheme in which the subcarrier mapper maps the complex-valued symbols to the respective subcarriers of the frequency domain;

FIG. 9 shows examples of a subframe through which a reference signal is transmitted;

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rtes for GSM evolution (EDGE). The OFDMA may be implemented by a radio technology such as IEEE (Institute of Electrical and Electronics Engineers) 802.11 (Wi-Fi), IEEE 802.16

(WiMAX), IEEE 802.20, E-UTRA (Evolved UTRA), and the like. IEEE 802.16m, an evolution of IEEE 802.16e, provides backward compatibility with a system based on IEEE 802.16e. The UTRA is part of a universal mobile telecommunications system (UMTS). 3GPP (3$^{rd}$ generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

Hereinafter, for clarification, LTE-A will be largely described, but the technical concept of the present invention is not meant to be limited thereto.

Figure 1:
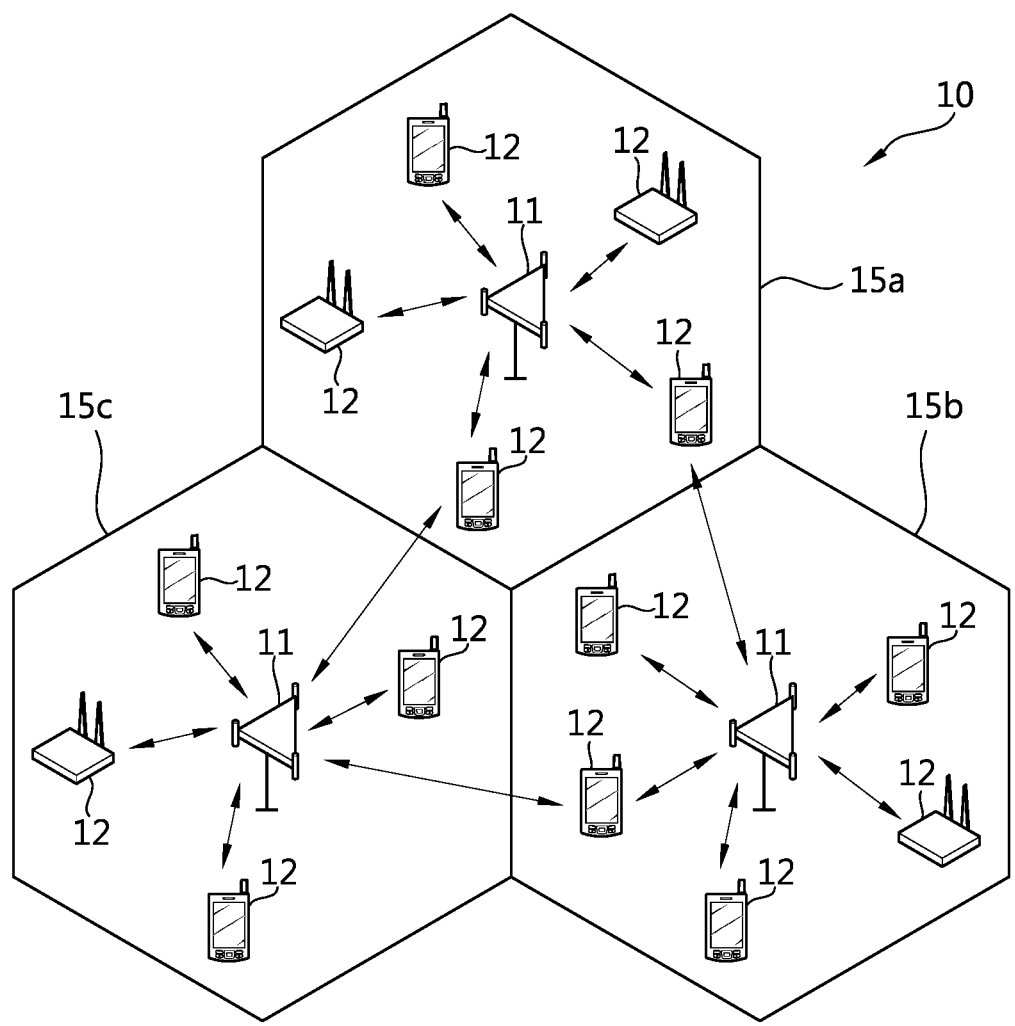
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as MS (mobile station), MT (mobile terminal), UT (user terminal), SS (subscriber station), wireless device, PDA (personal digital assistant), wireless modem, handheld device. The BS 11 generally refers to a fixed station that communicates with the UE 12 and may be called by other names such as eNB (evolved-NodeB), BTS (base transceiver system), access point (AP), etc.

In general, a UE belongs to one cell, and the cell to which a TIE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas.

Hereinafter, a transmission antenna refers to a physical or logical antenna used for transmitting a signal or a stream, and a reception antenna refers to a physical or logical antenna used for receiving a signal or a stream.

Figure 2:
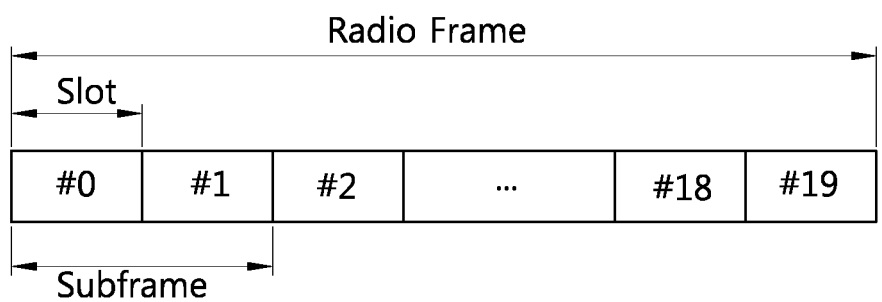
FIG. 2 shows the structure of a radio frame in 3GPP LTE.

FIG. 2 shows the structure of a radio frame in 3GPP LTE. It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03).

Referring to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when a single carrier frequency division multiple access (SC-FDMA) is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

Figure 3:
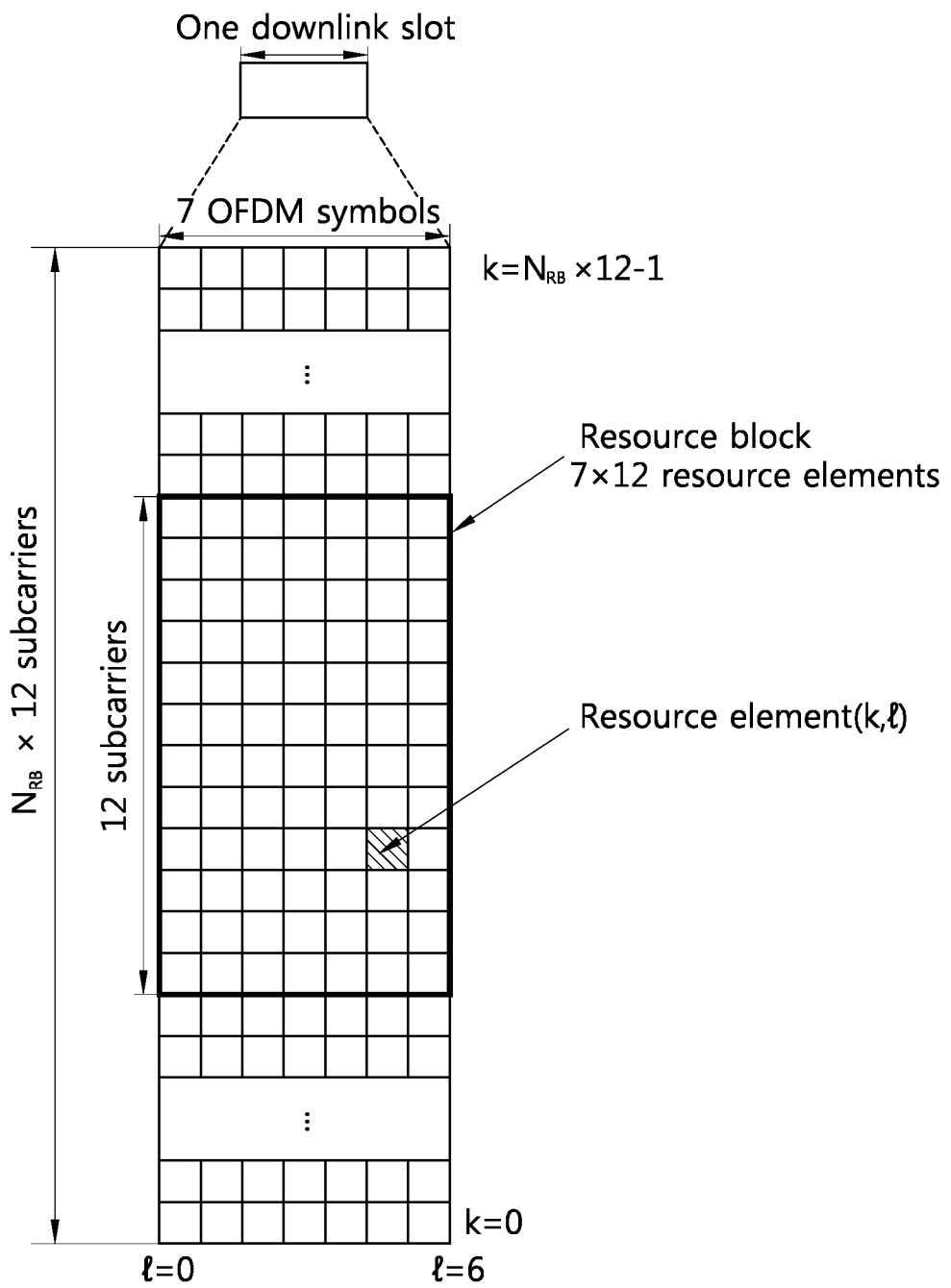
FIG. 3 shows an example of a resource grid of a single downlink slot.

FIG. 3 shows an example of a resource grid of a single downlink slot.

A downlink slot includes a plurality of OFDM symbols in the time domain and $N_{RB}$ number of resource blocks (RBs) in the frequency domain. The $N_{RB}$ number of resource blocks included in the downlink slot is dependent upon a downlink transmission bandwidth set in a cell. For example, in an LTE system, $N_{RB}$ may be any one of 60 to 110. One resource block includes a plurality of subcarriers in the frequency domain. An uplink slot may have the same structure as that of the downlink slot.

Each element on the resource grid is called a resource element. The resource elements on the resource grid can be discriminated by a pair of indexes (k,l) in the slot. Here, k (k=0, . . . , $N_{RB} \times 12-1$) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a cyclic prefix (CP), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
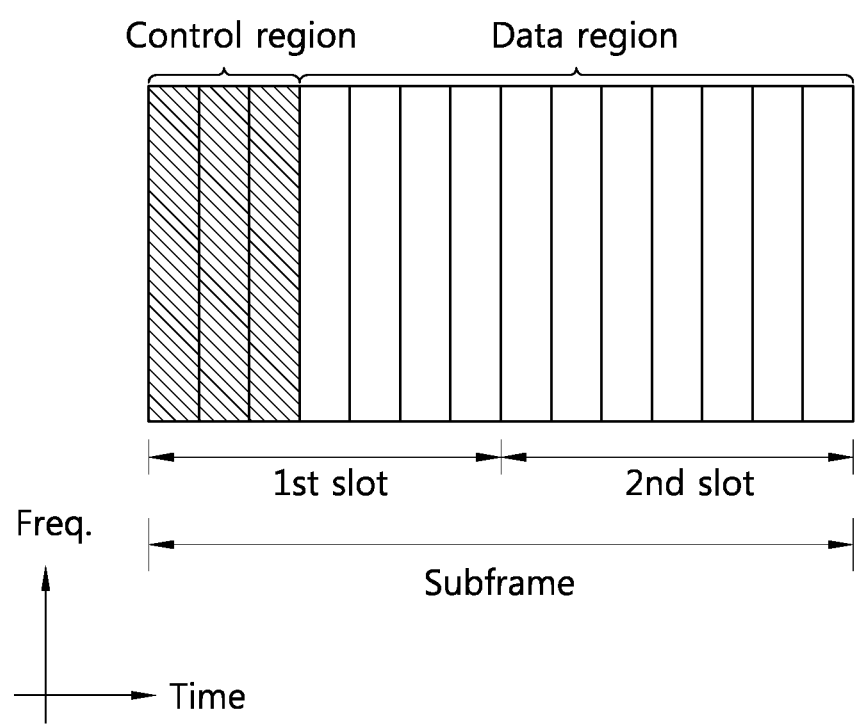
FIG. 4 shows the structure of a downlink subframe.

FIG. 4 shows the structure of a downlink subframe.

A downlink subframe includes two slots in the time domain, and each of the slots includes seven OFDM symbols in the normal CP. First three OFDM symbols (maximum four OFDM symbols with respect to a 1.4 MHz bandwidth) of a first slot in the subframe corresponds to a control region to which control channels are allocated, and the other remaining OFDM symbols correspond to a data region to which a physical downlink shared channel (PDSCH) is allocated. Down link control channels used in the 3GPP LTE include a physical control format indicator channel (PCFICH), a physical downlink control channel (PDCCH), a physical hybrid-ARQ indicator channel (PHICH), and so on. The PCFICH transmitted in the first OFDM symbol of a subframe carries information about the number of OFDM symbols (that is, the size of a control region) which is used to transmit control channels within the subframe. The PHICH carries an acknowledgement (ACK)/non-acknowledgement (NACK) signal for an uplink hybrid automatic repeat request (HARQ). In other words, an ACK/NACK signal for uplink data transmitted by a user equipment is transmitted on the PHICH. Control information transmitted through the PDCCH is called downlink control information (DCI). The DCI indicates uplink or downlink scheduling information, an uplink transmission power control command for specific user equipment groups, etc. Especially, a DCI format 0 among DCIs may be used for scheduling of a physical uplink shared channel (PUSCH).

FIG. 5 shows the structure of an uplink subframe.

An uplink subframe may be divided into a control region and a data region in the frequency domain. A physical uplink control channel (PUCCH) for transmitting uplink control information is allocated to the control region. A physical uplink shared channel (PUSCH) for transmitting data is allocated to the data region. The user equipment does not transmit the PUCCH and the PUSCH simultaneously to maintain a single carrier property.

The PUCCH with respect to a UE is allocated by a pair of resource blocks in a subframe. The resource blocks belonging to the pair of resource blocks (RBs) occupy different subcarriers in first and second slots, respectively. The frequency occupied by the RBs belonging to the pair of RBs is changed based on a slot boundary. This is said that the pair of RBs allocated to the PUCCH are frequency-hopped at the slot boundary. The UE can obtain a frequency diversity gain by transmitting uplink control information through different subcarriers according to time. In FIG. 5, m is a position index indicating the logical frequency domain positions of the pair of RBs allocated to the PUCCH in the subframe.

Uplink control information transmitted on the PUCCH may include a HARQ ACK/NACK, a channel quality indicator (CQI) indicating the state of a downlink channel, a scheduling request (SR), and the like.

The PUSCH is mapped to a uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

In an LTE-A system, UL adopts an SC-FDMA transmission scheme. A transmission scheme in which IFFT is performed after DFT spreading is called SC-FDMA. SC-FDMA may also be called a discrete Fourier transform spread (DFT-s) OFDM. In SC-FDMA, the peak-to-average power ratio (PAPR) or a cubic metric (CM) may be lowered. If the SC-FDMA transmission scheme is used, transmission power efficiency in a UE having limited power consumption may be increased because the non-linear distortion period of a power amplifier may be avoided. Consequently, user throughput may be increased.

Figure 6:
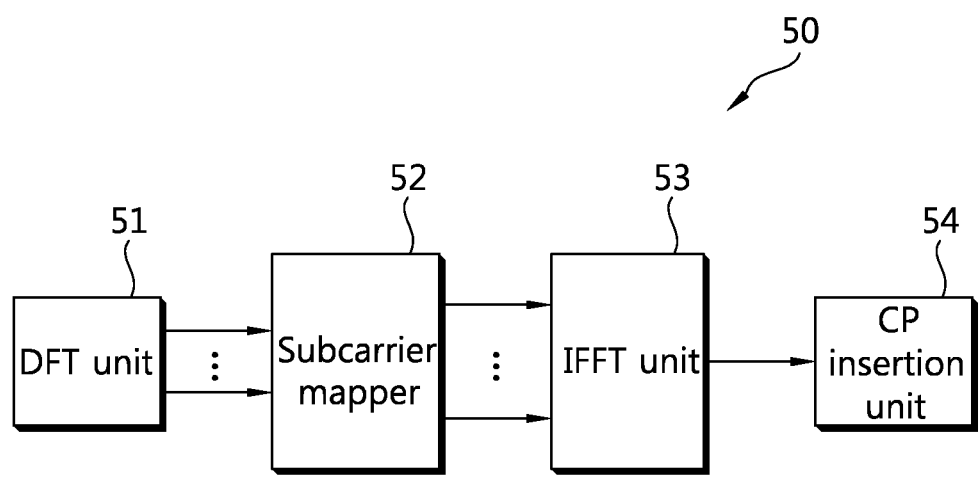
FIG. 6 shows an example of the structure of a transmitter in an SC-FDMA system.

FIG. 6 shows an example of the structure of a transmitter in an SC-FDMA system.

Referring to FIG. 6, the transmitter 50 includes a discrete Fourier transform (DFT) unit 51, a subcarrier mapper 52, an inverse fast Fourier transform (IFFT) unit 53, and a cyclic prefix (CP) insertion unit 54. The transmitter 50 may include a scramble unit (not shown), a modulation mapper (not shown), a layer mapper (not shown), and a layer permutator (not shown), which may be placed in front of the DFT unit 51.

The DFT unit 51 outputs complex-valued symbols by performing DFT on input symbols. For example, when $N_{tx}$ symbols are input (where N is a natural number), a DFT size is $N_{tx}$. The DFT unit 51 may be called a transform precoder. The subcarrier mapper 52 maps the complex-valued symbols to the respective subcarriers of the frequency domain. The complex-valued symbols may be mapped to resource elements corresponding to a resource block allocated for data transmission. The subcarrier mapper 52 may be called a resource element mapper. The IFFT unit 53 outputs a baseband signal for data (that is, a time domain signal) by performing IFFT on the input symbols. The CP insertion unit 54 copies some of the rear part of the baseband signal for data and inserts the copied parts into the former part of the baseband signal for data. Orthogonality may be maintained even in a multi-path channel because inter-symbol interference (ISI) and inter-carrier interference (ICI) are prevented through CP insertion.

FIG. 7 shows an example of a scheme in which the subcarrier mapper maps the complex-valued symbols to the respective subcarriers of the frequency domain. Referring to FIG. 7(a), the subcarrier mapper maps the complex-valued symbols, outputted from the DFT unit, to subcarriers contiguous to each other in the frequency domain. '0' is inserted into subcarriers to which the complex-valued symbols are not mapped. This is called localized mapping. In a 3GPP LTE system, a localized mapping scheme is used. Referring to FIG. 7(b), the subcarrier mapper inserts an (L−1) number of '0' every two contiguous complex-valued symbols which are outputted from the DFT unit (L is a natural number). That is, the complex-valued symbols outputted from the DFT unit are mapped to subcarriers distributed at equal intervals in the frequency domain. This is called distributed mapping. If the subcarrier mapper uses the localized mapping scheme as in FIG. 7(a) or the distributed mapping scheme as in FIG. 7(b), a single carrier characteristic is maintained.

Figure 8:
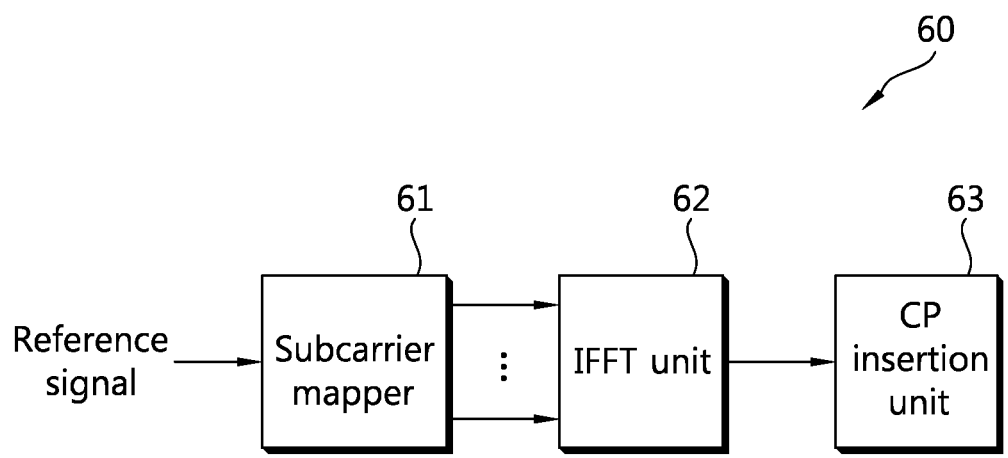
FIG. 8 shows an example of the structure of a reference signal transmitter for demodulation.

FIG. 8 shows an example of the structure of a reference signal transmitter for demodulation.

Referring to FIG. 8 the reference signal transmitter 60 includes a subcarrier mapper 61, an IFFT unit 62, and a CP insertion unit 63. Unlike the transmitter 50 of FIG. 6, in the reference signal transmitter 60, a reference signal is directly generated in the frequency domain without passing through the DFT unit 51 and then mapped to subcarriers through the subcarrier mapper 61. Here, the subcarrier mapper may map the reference signal to the subcarriers using the localized mapping scheme of FIG. 7(a).

FIG. 9 shows examples of a subframe through which a reference signal is transmitted. The structure of the subframe in FIG. 9(a) shows a case of a normal CP. The subframe includes a first slot and a second slot. Each of the first slot and the second slot includes 7 OFDM symbols. The 14 OFDM symbols within the subframe are assigned respective symbol indices 0 to 13. A reference signal may be transmitted through the OFDM symbols having the symbol indices 3 and 10. Data may be transmitted through the remaining OFDM symbols other than the OFDM symbols through which the reference signal is transmitted. The structure of a subframe in FIG. 9(b) shows a case of an extended CP. The subframe includes a first slot and a second slot. Each of the first slot and the second slot includes 6 OFDM symbols. The 12 OFDM symbols within the subframe are assigned symbol indices 0 to 11. A reference signal is transmitted through the OFDM symbols having the symbol indices 2 and 8. Data is transmitted through the remaining OFDM symbols other than the OFDM symbols through which the reference signal is transmitted.

Although not shown in FIG. 9, a sounding reference signal (SRS) may be transmitted through the OFDM symbols within the subframe. The SRS is a reference signal for UL scheduling which is transmitted from a UE to a BS. The BS estimates a UL channel through the received SRS and uses the estimated UL channel in UL scheduling.

A clustered DFT-s OFDM transmission scheme is a modification of the existing SC-FDMA transmission scheme and is a method of dividing data symbols, subjected to a precoder, into a plurality of subblocks, separating the subblocks, and mapping the subblocks in the frequency domain.

Figure 10:
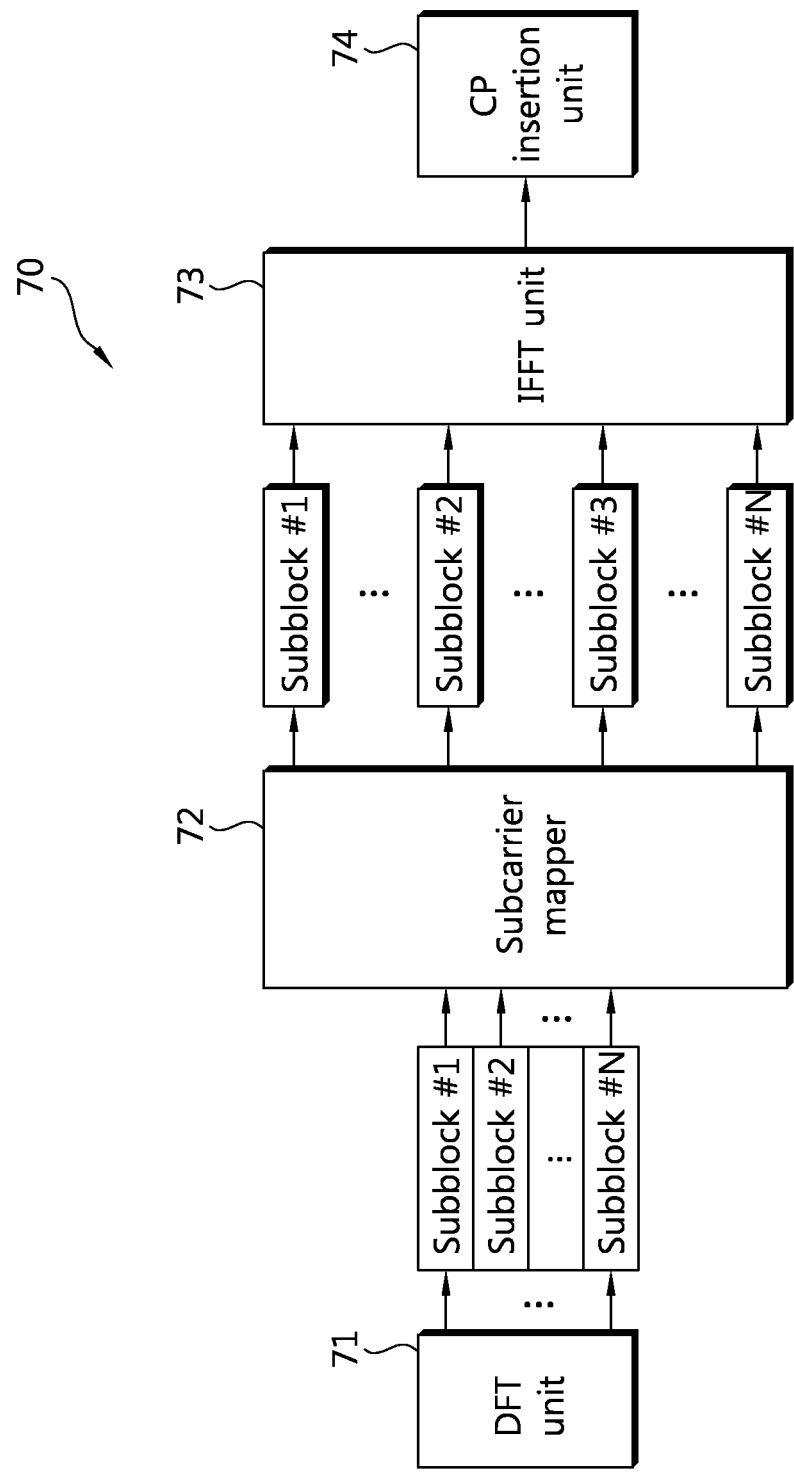
FIG. 10 shows an example of a transmitter using the clustered DFT-s OFDM transmission scheme.

FIG. 10 shows an example of a transmitter using the clustered DFT-s OFDM transmission scheme. Referring to FIG. 10, the transmitter 70 includes a DFT unit 71, a subcarrier mapper 72, an IFFT unit 73, and a CP insertion unit 74. The transmitter 70 may further include a scramble unit (not shown), a modulation mapper (not shown), a layer mapper (not shown), and a layer permutator (not shown), which may be placed in front of the DFT unit 71.

Complex-valued symbols outputted from the DFT unit 71 are divided into N subblocks (N is a natural number). The N subblocks may be represented by a subblock #1, a subblock #2, . . . , a subblock #N. The subcarrier mapper 72 distributes the N subblocks in the frequency domain and maps the N subblocks to subcarriers. The NULL may be inserted every two contiguous subblocks. The complex-valued symbols within one subblock may be mapped to subcarriers contiguous to each other in the frequency domain. That is, the localized mapping scheme may be used within one subblock.

The transmitter 70 of FIG. 10 may be used both in a single carrier transmitter or a multi-carrier transmitter. If the transmitter 70 is used in the single carrier transmitter, all the N subblocks correspond to one carrier. If the transmitter 70 is used in the multi-carrier transmitter, each of the N subblocks may correspond to one carrier. Alternatively, even if the transmitter 70 is used in the multi-carrier transmitter, a plurality of subblocks of the N subblocks may correspond to one carrier. Meanwhile, in the transmitter 70 of FIG. 10, a time domain signal is generated through one IFFT unit 73. Accordingly, in order for the transmitter 70 of FIG. 10 to be used in a multi-carrier transmitter, subcarrier intervals between contiguous carriers in a contiguous carrier allocation situation must be aligned.

Figure 11:
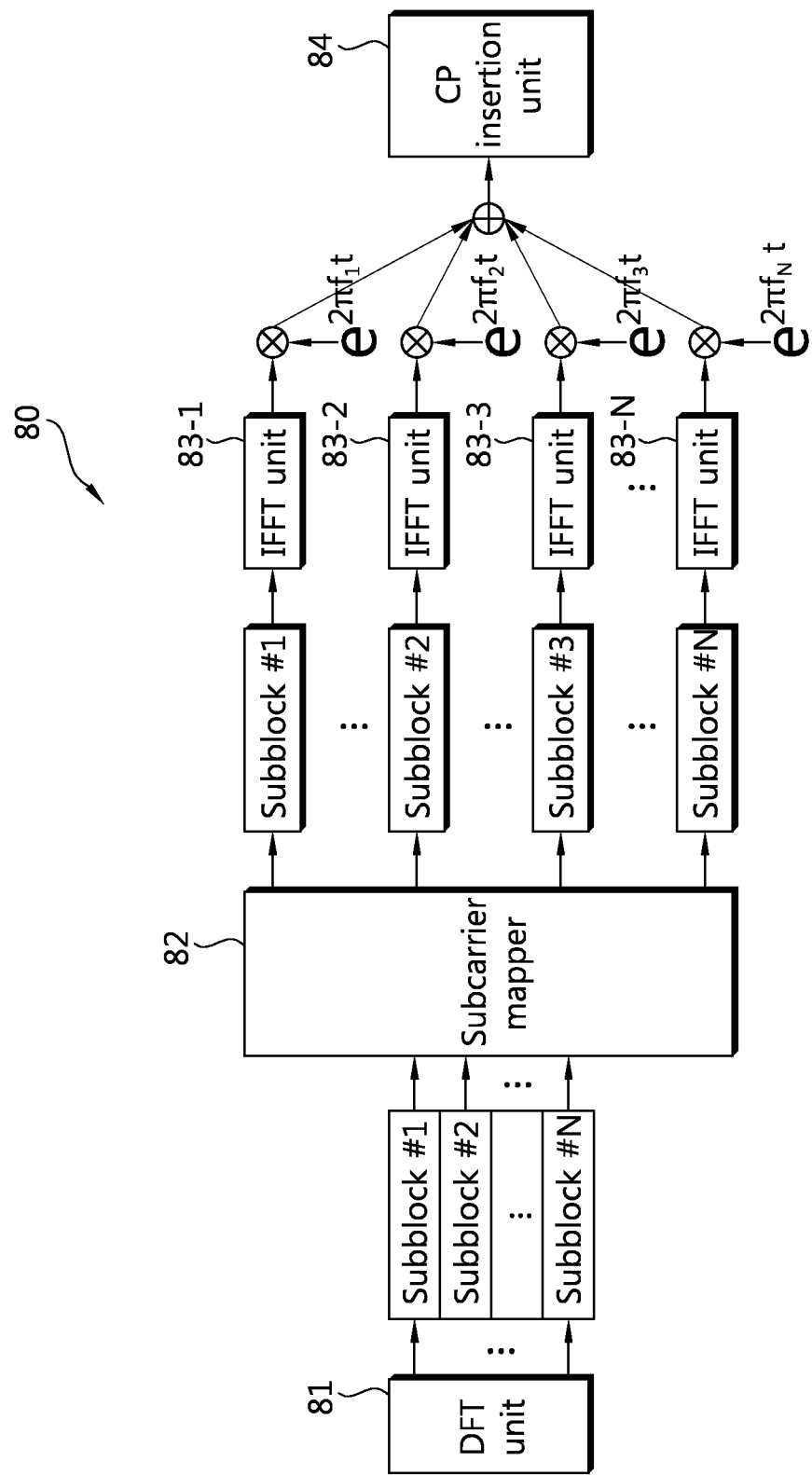
FIG. 11 shows another example of a transmitter using the clustered DFT-s OFDM transmission scheme.

FIG. 11 shows another example of a transmitter using the clustered DFT-s OFDM transmission scheme. Referring to FIG. 11, the transmitter 80 includes a DFT unit 81, a subcarrier mapper 82, a plurality of IFFT units 83-1, 83-2, . . . , 83-N (N is a natural number), and a CP insertion unit 84. The transmitter 80 may further include a scramble unit (not shown), a modulation mapper (not shown), a layer mapper (not shown), and a layer permutator (not shown), which may be placed in front of the DFT unit 71.

IFFT is individually performed on each of N subblocks. An $n^{th}$ IFFT unit 83-$n$ outputs an $n^{th}$ baseband signal (n=1, 2, . . . , N) by performing IFFT on a subblock #n. The $n^{th}$ baseband signal is multiplied by an $n^{th}$ carrier signal to produce an $n^{th}$ radio signal. After the N radio signals generated from the N subblocks are added, a CP is inserted by the CP insertion unit 84. The transmitter 80 of FIG. 11 may be used in a discontinuous carrier allocation situation where carriers allocated to the transmitter are not contiguous to each other.

Figure 12:
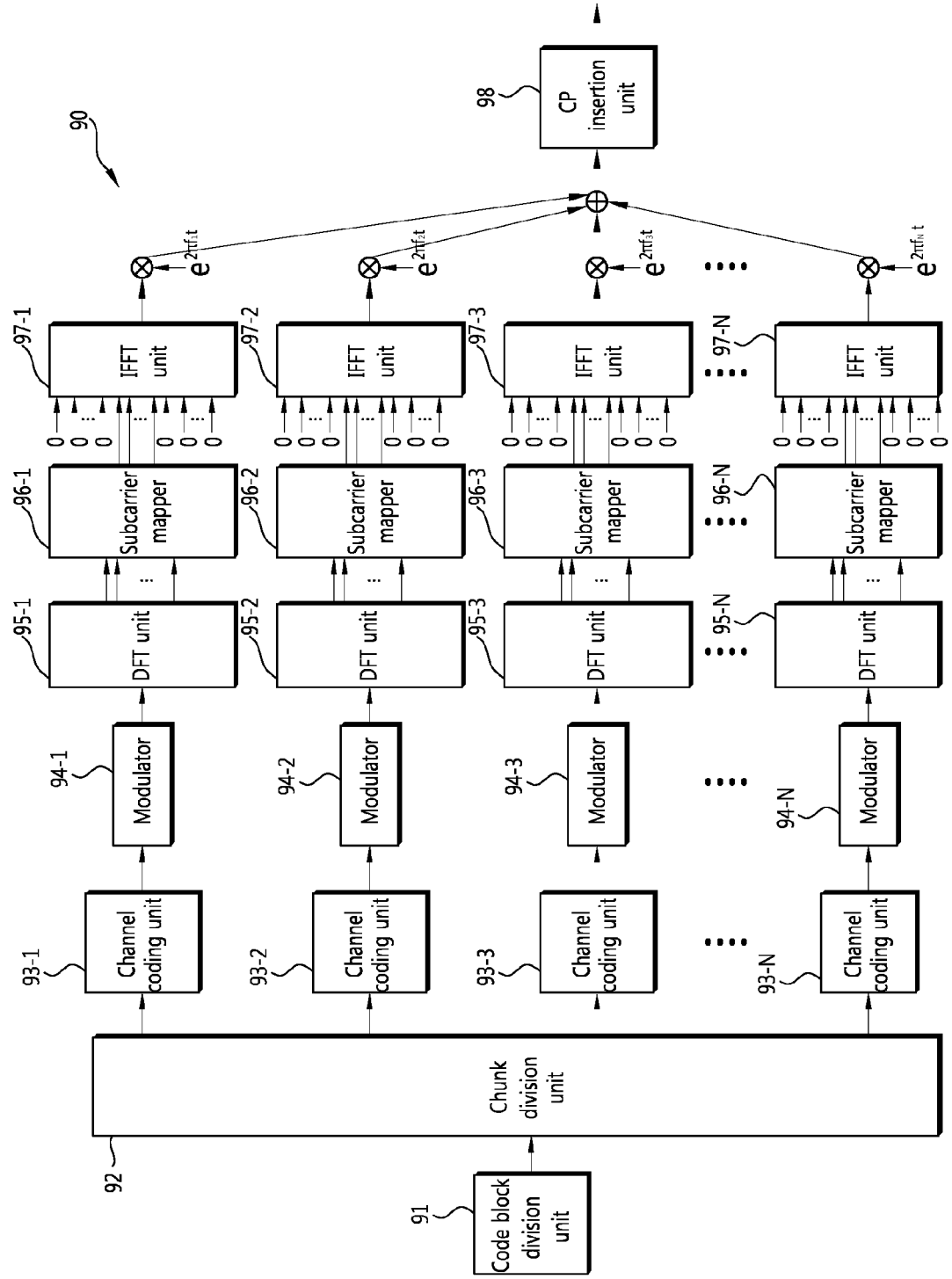
FIG. 12 is yet another example of a transmitter using the clustered DFT-s OFDM transmission scheme.

FIG. 12 is yet another example of a transmitter using the clustered DFT-s OFDM transmission scheme. FIG. 12 is a chunk-specific DFT-s OFDM system performing DFT precoding on a chunk basis. This may be called Nx SC-FDMA. Referring to FIG. 12, the transmitter 90 includes a code block division unit 91, a chunk division unit 92, a plurality of channel coding units 93-1, . . . , 93-N, a plurality of modulators 94-1, . . . , 94-N, a plurality of DFT units 95-1, . . . , 95-N, a plurality of subcarrier mappers 96-1, . . . , 96-N, a plurality of IFFT units 97-1, . . . , 97-N, and a CP insertion unit 98. Here, N may be the number of multiple carriers used by a multi-carrier transmitter. Each of the channel coding units 93-1, . . . , 93-N may include a scramble unit (not shown). The modulators 94-1, . . . , 94-N may also be called modulation mappers. The transmitter 90 may further include a layer mapper (not shown) and a layer permutator (not shown) which may be placed in front of the DFT units 95-1, . . . , 95-N.

The code block division unit 91 divides a transmission block into a plurality of code blocks. The chunk division unit 92 divides the code blocks into a plurality of chunks. Here, the code block may be data transmitted by a multi-carrier transmitter, and the chunk may be a data piece transmitted through one of multiple carriers. The transmitter 90 performs DFT on a chunk basis. The transmitter 90 may be used in a discontinuous carrier allocation situation or a contiguous carrier allocation situation.

A UL reference signal is described below.

In general, the reference signal is transmitted in the form of a sequence. A specific sequence may be used as the reference signal sequence without a special limit. A phase shift keying (PSK)-based computer generated sequence may be used as the reference signal sequence. Examples of PSK include binary phase shift keying (BPSK) and quadrature phase shift keying (QPSK). Alternatively, a constant amplitude zero auto-correlation (CAZAC) sequence may be used as the reference signal sequence. Examples of the CAZAC sequence include a Zadoff-Chu (ZC)-based sequence, a ZC sequence with cyclic extension, and a ZC sequence with truncation. Alternatively, a pseudo-random (PN) sequence may be used as the reference signal sequence. Examples of the PN sequence include an m-sequence, a computer-generated sequence, a gold sequence, and a Kasami sequence. A cyclically shifted sequence may be used as the reference signal sequence.

A UL reference signal may be divided into a demodulation reference signal (DMRS) and a sounding reference signal (SRS). The DMRS is a reference signal used in channel estimation for the demodulation of a received signal. The DMRS may be associated with the transmission of a PUSCH or PUCCH. The SRS is a reference signal transmitted from a UE to a BS for UL scheduling. The BS estimates an UL channel through the received SRS and uses the estimated UL channel in UL scheduling. The SRS is not associated with the transmission of a PUSCH or PUCCH. The same kind of a basic sequence may be used for the DMRS and the SRS. Meanwhile, in UL multi-antenna transmission, precoding applied to the DMRS may be the same as precoding applied to a PUSCH. Cyclic shift separation is a primary scheme for multiplexing the DMRS. In an LTE-A system, the SRS may not be precoded and may be an antenna-specific reference signal.

A reference signal sequence $r_{u,v}^{(\alpha)}(n)$ may be defined based on a basic sequence $b_{u,v}(n)$ and a cyclic shift $\alpha$ according to Equation 2.

$$r_{u,v}^{(\alpha)}(n)=e^{j\alpha n}b_{u,v}(n), 0 \le n < M_{sc}^{RS}$$

In Equation 2, $M_{sc}^{RS}(1 \le m \le N_{RB}^{max,UL})$ is the length of the reference signal sequence and $M_{sc}^{RS}=m*N_{sc}^{RB}$. $N_{sc}^{RB}$ is the size of a resource block indicated by the number of subcarriers in the frequency domain. $N_{RB}^{max,UL}$ indicates a maximum value of a UL bandwidth indicated by a multiple of $N_{sc}^{RB}$. A plurality of reference signal sequences may be defined by differently applying a cyclic shift value $\alpha$ from one basic sequence.

A basic sequence $b_{u,v}(n)$ is divided into a plurality of groups. Here, $u \in \{0, 1, \ldots, 29\}$ indicates a group index, and v indicates a basic sequence index within the group. The basic sequence depends on the length $M_{sc}^{RS}$ of the basic sequence. Each group includes a basic sequence (v=0) having a length of $M_{sc}^{RS}$ for m ($1 \leq m \leq 5$) and includes 2 basic sequences (v=0, 1) having a length of $M_{sc}^{RS}$ for m ($6 \leq m \leq n_{RB}^{max,UL}$). The sequence group index u and the basic sequence index v within a group may vary according to time as in group hopping or sequence hopping.

Furthermore, if the length of the reference signal sequence is $3N_{sc}^{RB}$ or higher, the basic sequence may be defined by Equation 3.

$$b_{u,v}(n) = (n \bmod N_{ZC}^{RS}), 0 \leq n < M_{sc}^{RS}$$

In Equation 3, q indicates a root index of a Zadoff-Chu (ZC) sequence. $N_{ZC}^{RS}$ is the length of the ZC sequence and may be a maximum prime number smaller than $M_{sc}RS$. The ZC sequence having the root index q may be defined by Equation 4.

$$x_q(m) = e^{-j\frac{\pi q m(m+1)}{N_{ZC}^{RS}}}, \quad 0 \leq m \leq N_{ZC}^{RS} - 1$$

q may be given by Equation 5.

$$q = \lfloor \bar{q} + \tfrac{1}{2} \rfloor + v \cdot (-1)^{\lfloor 2\bar{q} \rfloor}$$

$$\bar{q} = N_{ZC}^{RS} \cdot (u+1)/31$$

| | $\phi(0), \ldots, \phi(11)$ | | | | | | | | | | | |
|---|---|---|---|---|---|---|---|---|---|---|---|---|
| 0 | -1 | 1 | 3 | -3 | 3 | 3 | 1 | 1 | 3 | 1 | -3 | 3 |
| 1 | 1 | 1 | 3 | 3 | 3 | -1 | 1 | -3 | -3 | 1 | -3 | 3 |
| 2 | 1 | 1 | -3 | -3 | -3 | -1 | -3 | -3 | 1 | -3 | 1 | -1 |
| 3 | -1 | 1 | 1 | 1 | 1 | -1 | -3 | -3 | 1 | -3 | 3 | -1 |
| 4 | -1 | 3 | 1 | -1 | 1 | -1 | -3 | -1 | 1 | -1 | 1 | 3 |
| 5 | 1 | -3 | 3 | -1 | -1 | 1 | 1 | -1 | -1 | 3 | -3 | 1 |
| 6 | -1 | 3 | -3 | -3 | -3 | 3 | 1 | -1 | 3 | 3 | -3 | 1 |
| 7 | -3 | -1 | -1 | -1 | 1 | -3 | 3 | -1 | 1 | -3 | 3 | 1 |
| 8 | 1 | -3 | 3 | 1 | -1 | -1 | -1 | 1 | 1 | 3 | -1 | 1 |
| 9 | 1 | -3 | -1 | 3 | 3 | -1 | -3 | 1 | 1 | 1 | 1 | 1 |
| 10 | -1 | 3 | -1 | 1 | 1 | -3 | -3 | -1 | -3 | -3 | 3 | -1 |
| 11 | 3 | 1 | -1 | -1 | 3 | 3 | -3 | 1 | 3 | 1 | 3 | 3 |
| 12 | 1 | -3 | 1 | 1 | -3 | 1 | 1 | 1 | -3 | -3 | -3 | 1 |
| 13 | 3 | 3 | -3 | 3 | -3 | 1 | 1 | 3 | -1 | -3 | 3 | 3 |
| 14 | -3 | 1 | -1 | -3 | -1 | 3 | 1 | 3 | 3 | 3 | -1 | 1 |
| 15 | 3 | -1 | 1 | -3 | -1 | -1 | 1 | 1 | 3 | 1 | -1 | -3 |
| 16 | 1 | 3 | 1 | -1 | 1 | 3 | 3 | 3 | -1 | -1 | 3 | -1 |
| 17 | -3 | 1 | 1 | 3 | -3 | 3 | -3 | -3 | 3 | 1 | 3 | -1 |
| 18 | -3 | 3 | 1 | 1 | -3 | 1 | -3 | -3 | -1 | -1 | 1 | -3 |
| 19 | -1 | 3 | 1 | 3 | 1 | -1 | -1 | 3 | -3 | -1 | -3 | -1 |
| 20 | -1 | -3 | 1 | 1 | 1 | 1 | 3 | 1 | -1 | 1 | -3 | -1 |
| 21 | -1 | 3 | -1 | 1 | -3 | -3 | -3 | -3 | -3 | 1 | -1 | -3 |
| 22 | 1 | 1 | -3 | -3 | -3 | -3 | -1 | 3 | -3 | 1 | -3 | 3 |
| 23 | 1 | 1 | -1 | -3 | -1 | -3 | 1 | -1 | 1 | 3 | -1 | 1 |
| 24 | 1 | 1 | 3 | 1 | 3 | 3 | -1 | 1 | -1 | -3 | -3 | 1 |
| 25 | 1 | -3 | 3 | 3 | 1 | 3 | 3 | 1 | -3 | -1 | -1 | 3 |
| 26 | 1 | 3 | -3 | -3 | 3 | -3 | 1 | -1 | -1 | 3 | -1 | -3 |
| 27 | -3 | -1 | -3 | -1 | -3 | 3 | 1 | -1 | 1 | 3 | -3 | -3 |
| 28 | -1 | 3 | -3 | 3 | -1 | 3 | 3 | -3 | 3 | 3 | -1 | -1 |
| 29 | 3 | -3 | -3 | -1 | -1 | -3 | -1 | 3 | -3 | 3 | 1 | -1 |

Table 2 is an example where $\phi(n)$ is defined when $M_{sc}^{RS} = 2 \cdot N_{sc}^{RB}$.

| | $\phi(0), \ldots, \phi(23)$ | | | | | | | | | | | | | | | | | | | | | | | |
|---|---|---|---|---|---|---|---|---|---|---|---|---|---|---|---|---|---|---|---|---|---|---|---|---|
| 0 | -1 | 3 | 1 | -3 | 3 | -1 | 1 | 3 | -3 | 3 | 1 | 3 | -3 | 3 | 1 | 1 | -1 | 1 | 3 | -3 | 3 | -3 | -1 | -3 |
| 1 | -3 | 3 | -3 | -3 | -3 | 1 | -3 | -3 | 3 | -1 | 1 | 1 | 1 | 3 | 1 | -1 | 3 | -3 | -3 | 1 | 3 | 1 | 1 | -3 |
| 2 | 3 | -1 | 3 | 3 | 1 | 1 | -3 | 3 | 3 | 3 | 3 | 1 | -1 | 3 | -1 | 1 | 1 | -1 | -3 | -1 | -1 | 1 | 3 | 3 |
| 3 | -1 | -3 | 1 | 1 | 3 | -3 | 1 | 1 | -3 | -1 | -1 | 1 | 3 | 1 | 3 | 1 | -1 | 3 | 1 | 1 | -3 | -1 | -3 | -1 |
| 4 | -1 | -1 | -1 | -3 | -3 | -1 | 1 | 1 | 3 | 3 | -1 | 3 | -1 | 1 | -1 | -3 | 1 | -1 | -3 | -3 | 1 | -3 | -1 | -1 |
| 5 | -3 | 1 | 1 | 3 | -1 | 1 | 3 | 1 | -3 | 1 | -3 | 1 | 1 | -1 | -1 | 3 | -1 | -3 | 3 | -3 | -3 | -3 | 1 | 1 |
| 6 | 1 | 1 | -1 | -1 | 3 | -3 | -3 | 3 | -3 | 1 | -1 | -1 | 1 | -1 | 1 | 1 | -1 | -3 | -1 | 1 | -1 | 3 | -1 | -3 |
| 7 | -3 | 3 | 3 | -1 | -1 | -3 | -1 | 3 | 1 | 3 | 1 | 3 | 1 | 1 | -1 | 3 | 1 | -1 | 1 | 3 | -3 | -1 | -1 | 1 |
| 8 | -3 | 1 | 3 | -3 | 1 | -1 | 3 | 3 | -1 | -1 | -1 | 1 | -3 | -3 | 3 | 1 | -3 | -3 | 3 | -1 | 3 | -1 | 1 | -3 |
| 9 | 1 | 1 | -3 | 3 | 3 | -1 | -3 | -1 | 3 | -3 | 3 | 3 | 3 | -1 | 1 | 1 | -3 | 1 | -1 | 1 | 1 | -3 | 1 | 1 |
| 10 | -1 | 1 | -3 | -3 | 3 | -1 | 3 | -1 | -1 | -3 | -3 | -3 | -1 | -3 | -3 | 1 | -1 | 1 | 3 | 3 | -1 | 1 | -1 | 3 |
| 11 | 1 | 3 | 3 | -3 | -3 | 1 | 3 | 1 | -1 | -3 | -3 | -3 | 3 | 3 | -3 | 3 | 3 | -1 | -3 | 3 | -1 | 1 | -3 | 1 |
| 12 | 1 | 3 | 3 | 1 | 1 | 1 | -1 | -1 | 1 | -3 | 3 | -1 | 1 | 1 | -3 | 3 | 3 | -1 | 3 | -3 | -1 | -3 | -1 |
| 13 | 3 | -1 | -1 | -1 | -1 | -3 | -1 | 3 | 3 | 1 | -1 | 1 | 3 | 3 | -1 | 1 | 1 | -3 | 1 | 3 | -1 | -3 | 3 |
| 14 | -3 | -3 | 3 | 1 | 3 | 1 | -3 | 3 | 1 | 3 | 1 | 1 | 3 | 3 | -1 | -1 | -3 | 1 | -3 | -1 | 3 | 1 | 1 | 3 |
| 15 | -1 | -1 | 1 | -3 | 1 | 3 | -3 | 1 | -1 | -3 | -1 | 3 | 1 | 3 | 1 | -1 | -3 | -3 | -1 | -1 | -3 | -3 | -3 | -1 |
| 16 | -1 | -3 | 3 | -1 | -1 | -1 | -1 | 1 | 1 | -3 | 3 | 1 | 3 | 3 | 1 | -1 | 1 | -3 | 1 | -3 | 1 | 1 | -3 | -1 |
| 17 | 1 | 3 | -1 | 3 | 3 | -1 | -3 | 1 | -1 | -3 | 3 | 3 | 3 | -1 | 1 | 1 | 3 | -1 | -3 | -1 | 3 | -1 | -1 | -1 |
| 18 | 1 | 1 | 1 | 1 | 1 | -1 | 3 | -1 | -3 | 1 | 1 | 3 | -3 | 1 | -3 | -1 | 1 | 1 | -3 | -3 | 3 | 1 | 1 | -3 |
| 19 | 1 | 3 | 3 | 1 | -1 | -3 | 3 | -1 | 3 | 3 | 3 | -3 | 1 | -1 | 1 | -1 | -3 | -1 | 1 | 3 | -1 | 3 | -3 | -3 |
| 20 | -1 | -3 | 3 | -3 | -3 | -3 | -1 | -1 | -3 | -1 | -3 | 3 | 1 | 3 | -3 | -1 | 3 | -1 | 1 | -1 | 3 | -3 | 1 | -1 |
| 21 | -3 | -3 | 1 | 1 | -1 | 1 | -1 | 1 | -1 | 3 | 1 | -3 | -1 | 1 | -1 | 1 | -1 | -1 | 3 | 3 | -3 | -1 | 1 | -3 |
| 22 | -3 | -1 | -3 | 3 | 1 | -1 | -3 | -1 | -3 | -3 | 3 | -3 | 3 | -3 | -1 | 1 | 3 | 1 | -3 | 1 | 3 | 3 | -1 | -3 |
| 23 | -1 | -1 | -1 | -1 | 3 | 3 | 3 | 1 | 3 | 3 | -3 | 1 | 3 | -1 | 3 | -1 | 3 | 3 | -3 | 3 | 1 | -1 | 3 | 3 |
| 24 | 1 | -1 | 3 | 3 | -1 | -3 | 3 | -3 | -1 | -1 | 3 | -1 | 3 | -1 | -1 | 1 | 1 | 1 | 1 | -1 | -1 | -3 | -1 | 3 |
| 25 | 1 | -1 | 1 | -1 | 3 | -1 | 3 | 1 | 1 | -1 | -1 | -3 | 1 | 1 | -3 | 1 | 3 | -3 | 1 | 1 | -3 | -3 | -1 | -1 |
| 26 | -3 | -1 | 1 | 3 | 1 | 1 | -3 | -1 | -1 | -3 | 3 | -3 | 3 | 1 | -3 | 3 | -3 | 1 | -1 | 1 | -3 | 1 | 1 | 1 |
| 27 | -1 | -3 | 3 | 3 | 1 | 1 | 3 | -1 | -3 | -1 | -1 | -1 | 3 | 1 | -3 | -3 | -1 | 3 | -3 | -1 | -3 | -1 | -3 | -1 |
| 28 | -1 | -3 | -1 | -1 | 1 | -3 | -1 | -1 | 1 | -1 | -3 | 1 | 1 | -3 | 1 | -3 | -3 | 3 | 1 | 1 | -1 | 3 | -1 | -1 |
| 29 | 1 | 1 | -1 | -1 | -3 | -1 | 3 | -1 | 3 | -1 | 1 | 3 | 1 | -1 | 3 | 1 | 3 | -3 | -3 | 1 | -1 | -1 | 1 | 3 |

If the length of the reference signal sequence is $3N_{sc}^{RB}$ or less, the basic sequence may be defined by Equation 6.

$$b_{u,v}(n) = e^{j\phi(n)\pi/4}, 0 \leq n \leq M_{sc}^{RS} - 1$$

Table 1 is an example where $\phi(n)$ is defined when $M_{sc}^{RS} = N_{sc}^{RB}$.

Hopping of a reference signal may be applied as follows.

The sequence group index u of a slot index $n_s$ may be defined based on a group hopping pattern $f_{gh}(n_s)$ and a sequence shift pattern $f_{ss}$ according to Equation 7.

$$u = (f_{gh}(n_s) + f_{ss}) \bmod 30$$

17 different group hopping patterns and 30 different sequence shift patterns may exist. Whether to apply group hopping may be indicated by a higher layer.

A PUCCH and a PUSCH may have the same group hopping pattern. A group hopping pattern $f_{gh}(n_s)$ may be defined by Equation 8.

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases}$$

In Equation 8, c(i) is a pseudo random sequence that is a PN sequence and may be defined by a Gold sequence of a length-31. Equation 9 shows an example of a gold sequence c(n).

$$c(n) = (x_1(n+N_c) + x_2(n+N_c)) \bmod 2$$

$$x_1(n+31) = (x_1(n+3) + x_1(n)) \bmod 2$$

$$x_2(n+31) = (x_2(n+3) + x_2(n+2) + x_1(n+1) + x_1(n)) \bmod 2$$

Here, Nc=1600, $x_1(i)$ is a first m-sequence, and $x_2(i)$ is a second m-sequence. For example, the first m-sequence or the second m-sequence may be initialized according to a cell identifier (ID) for every OFDM symbol, a slot number within one radio frame, an OFDM symbol index within a slot, and the type of a CP. A pseudo random sequence generator may be initialized to $$c_{init} = \left\lfloor \frac{N_{ID}^{cell}}{30} \right\rfloor$$

in the first of each radio frame.

A PUCCH and a PUSCH may have the same sequence shift pattern. The sequence shift pattern of the PUCCH may be $f_{ss}^{PUCCH} = N_{ID}^{cell} \bmod 30$. The sequence shift pattern of the PUSCH may be $f_{ss}^{PUCCH} = (f_{ss}^{PUCCH} + \Delta_{ss}) \bmod 30$ and $\Delta_{ss} \in \{0, 1, \ldots, 29\}$ may be configured by a higher layer.

Sequence hopping may be applied to only a reference signal sequence having a length longer than $6N_{sc}^{RB}$. Here, a basic sequence index v within a basic sequence group of a slot index II, may be defined by Equation 10.

$$v = \begin{cases} c(n_s) & \text{if group hopping is disabled and sequence hopping is enabled} \\ 0 & \text{otherwise} \end{cases}$$

c(i) may be represented by an example of Equation 9. Whether to apply sequence hopping may be indicated by a higher layer. A pseudo random sequence generator may be initialized to $$c_{init} = \left\lfloor \frac{N_{ID}^{cell}}{30} \right\rfloor \cdot 2^5 + f_{ss}^{PUSCH}$$

in the first of each radio frame.

A DMRS sequence for a PUSCH may be defined by Equation 11.

$$r^{PUSCH}(m \cdot M_{sc}^{RS} + n) = r_{u,v}^{(\alpha)}(n)$$

In Equation 11, m=0, 1, . . . and n=0, . . . , $M_{sc}^{RS}$-1. $M_{sc}^{RS} = M_{sc}^{PUSCH}$.

$\alpha = 2\pi n_{cs}/12$, that is, a cyclic shift value is given within a slot, and $n_{cs}$ may be defined by Equation 12.

$$n_{cs} = (n_{DMRS}^{(1)} + n_{DMRS}^{(2)} + n_{PRS}(n_s)) \bmod 12$$

In Equation 12, $n_{DMRS}^{(1)}$ is indicated by a parameter transmitted by a higher layer, and Table 3 shows an example of a corresponding relationship between the parameter and $n_{DMRS}^{(1)}$.

| Parameter | $n_{DMRS}^{(1)}$ |
|---|---|
| 0 | 0 |
| 1 | 2 |
| 2 | 3 |
| 3 | 4 |
| 4 | 6 |
| 5 | 8 |
| 6 | 9 |
| 7 | 10 |

Back in Equation 12, $n_{DMRS}^{(2)}$ may be defined by a cyclic shift field within a DCI format 0 for a transmission block corresponding to PUSCH transmission. The DCI format is transmitted in a PDCCH. The cyclic shift field may have a length of 3 bits.

Table 4 shows an example of a corresponding relationship between the cyclic shift field and $n_{DMRS}^{(2)}$.

| Cyclic shift field in DCI format 0 | $n_{DMRS}^{(2)}$ |
|---|---|
| 000 | 0 |
| 001 | 6 |
| 010 | 3 |
| 011 | 4 |
| 100 | 2 |
| 101 | 8 |
| 110 | 10 |
| 111 | 9 |

Table 5 is another example of a corresponding relationship between the cyclic shift field and $n_{DMRS}^{(2)}$.

| Cyclic shift field in DCI format 0 | $n_{DMRS}^{(2)}$ |
|---|---|
| 000 | 0 |
| 001 | 2 |
| 010 | 3 |
| 011 | 4 |
| 100 | 6 |
| 101 | 8 |
| 110 | 9 |
| 111 | 10 |

If a PDCCH including the DCI format 0 is not transmitted in the same transmission block, if the first PUSCH is semi-persistently scheduled in the same transmission block, or if the first PUSCH is scheduled by a random access response grant in the same transmission block, $n_{DMRS}^{(2)}$ may be 0.

$n_{PRS}(n_s)$ may be defined by Equation 13.

$$n_{PRS}(n_s) = \sum_{i=0}^{7} c(8N_{symb}^{UL} \cdot n_s + i) \cdot 2^i$$

c(i) may be represented by the example of Equation 9 and may be applied in a cell-specific way of c(i). A pseudo random sequence generator may be initialized to $$c_{init} = \left\lfloor \frac{N_{ID}^{cell}}{30} \right\rfloor \cdot 2^5 + f_{ss}^{PUSCH}$$

in the first of each radio frame.

A DMRS sequence $r^{PUSCH}$ is multiplied by an amplitude scaling factor $\beta_{PUSCH}$ and mapped to a physical transmission block, used in relevant PUSCH transmission, from $r^{PUSCH}(0)$ in a sequence starting. The DIVERS sequence is mapped to a fourth OFDM symbol (OFDM symbol index 3) in case of a normal CP within one slot and mapped to a third OFDM symbol (OFDM symbol index 2) within one slot in case of an extended CP.

An SRS sequence $r_{SRS}(n) = r_{u,v}^{(\alpha)}$ is defined. u indicates a PUCCH sequence group index, and v indicates a basic sequence index. The cyclic shift value $\alpha$ is defined by Equation 14.

$$\alpha = 2\pi \frac{n_{SRS}^{cs}}{8}$$

$n_{SRS}^{cs}$ is a value configured by a higher layer in related to each UE and may be any one of integers from 0 to 7.

A proposed method of transmitting a reference signal is described below.

In a current LTE system, there have not yet been proposed a method of transmitting a reference signal, which supports a MIMO system using a plurality of antennas in UL transmission, and a method of allocating the cyclic shift values of a reference signal sequence using the method. Accordingly, the present invention proposes a method of transmitting a reference signal and a method of allocating cyclic shift values which guarantee the performance of channel estimation in an MIMO system. The present invention may be applied to OFDM, SC-FDMA, and clustered DFT-s OFDM systems and also to other types of systems. Furthermore, an example where the proposed method of transmitting a reference signal is applied to a UL reference signal is described, but not limited thereto. The proposed method may also be applied to a DL reference signal. Furthermore, the proposed method is not limited to whether precoding is performed.

Figure 13:
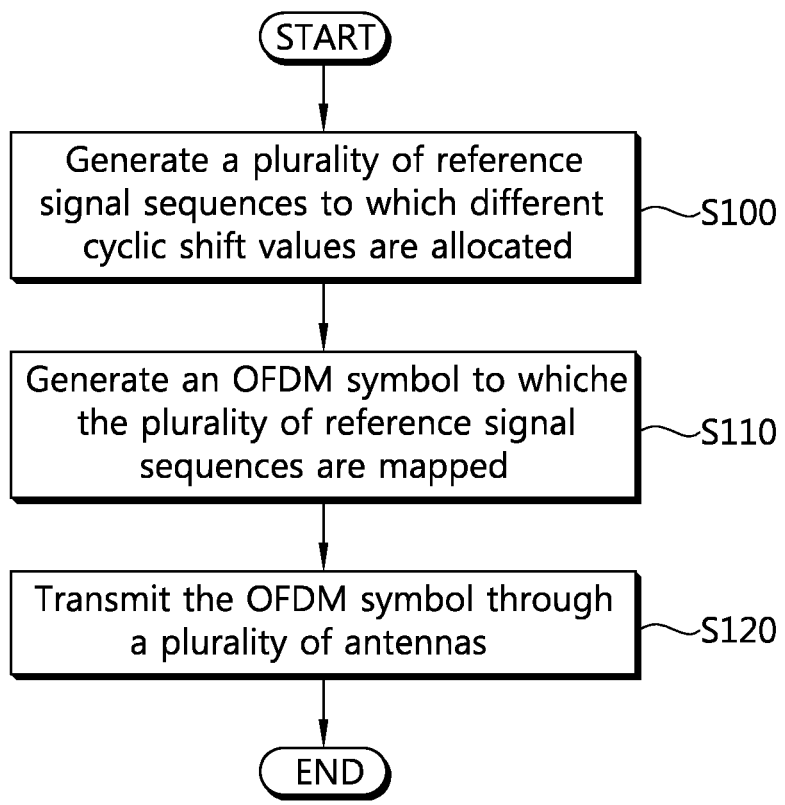
FIG. 13 shows an embodiment of a proposed method of transmitting a reference signal.

FIG. 13 shows an embodiment of the proposed method of transmitting a reference signal.

At step S100, a UE generates a plurality of reference signal sequences to which different cyclic shift values are allocated. At step S110, the UE generates OFDM symbols to which the plurality of reference signal sequences is mapped. At step S120, the UE transmits the OFDM symbols to a BS through a plurality of antennas.

A variety of methods may be used to allocate the different cyclic shift values to the plurality of reference signal sequences. It is assumed that the reference signal is a DMRS.

First, a method of continuously allocating the cyclic shift values of a reference signal sequence to the relevant layer of each rank based on $n_{DMRS}^{(2)}$ and a fixed offset may be used.

For example, assuming that the cyclic shift value of a DMRS sequence for a first layer (hereinafter referred to as a first layer cyclic shift) is $n_{DMRS}^{(2)}$, the cyclic shift value of the DMRS sequence for a second layer (hereinafter referred to as a second layer cyclic shift) may be determined as $(n_{DMRS}^{(2)} +$ offset) mod $CS_{total}$. Next, the cyclic shift value of the DMRS sequence for a third layer (hereinafter referred to as a third layer cyclic shift) and the cyclic shift value of the DMRS sequence for a fourth layer (hereinafter referred to as a fourth layer cyclic shift) may be determined as $(n_{DMRS}^{(2)}+2*\text{offset})$ mod $CS_{total}$ and $(n_{DMRS}^{(2)}+3*\text{offset})$ mod $CS_{total}$, respectively. That is, the first layer cyclic shift to the fourth layer cyclic shift are continuously allocated at constant intervals of the offset. $n_{DMRS}^{(2)}$ may be determined by a cyclic shift field within the DCI format 0 transmitted through the PDCCH as described above. $CS_{total}$ is a total number of cyclic shifts and may be any one of 6, 8 or 12. Furthermore, the offset may be any one of 1, 2, and 3.

Table 6 to Table 11 illustrate cyclic shift values according to $n_{DMRS}^{(2)}$ and layer indices when the number of layers is 4. For example, in Table 6, if $n_{DMRS}^{(2)}=9$, the offset is 1, and $CS_{total}=12$, a first layer cyclic shift is $n_{DMRS}^{(2)}=9$, and a second layer cyclic shift is $(n_{DMRS}^{(2)}+\text{offset})$ mod $CS_{total}=(9+1)$ mod $12=10$. Likewise, a third layer cyclic shift is $(n_{DMRS}^{(2)}+\text{offset})$ mod $CS_{total}=(9+2)$ mod $12=11$, and a fourth layer cyclic shift is $(n_{DMRS}^{(2)}+\text{offset})$ mod $CS_{total}=(9+3)$ mod $12=0$.

Table 6 is a case where the offset is 1.

| Cyclic shift field | $n_{DMRS}^{(2)}$ | First layer cyclic shift | Second layer cyclic shift | Third layer cyclic shift | Fourth layer cyclic shift |
|---|---|---|---|---|---|
| 000 | 0 | 0 | 1 | 2 | 3 |
| 001 | 2 | 2 | 3 | 4 | 5 |
| 010 | 3 | 3 | 4 | 5 | 6 |
| 011 | 4 | 4 | 5 | 6 | 7 |
| 100 | 6 | 6 | 7 | 8 | 9 |
| 101 | 8 | 8 | 9 | 10 | 11 |
| 110 | 9 | 9 | 10 | 11 | 0 |
| 111 | 10 | 10 | 11 | 0 | 1 |

Table 7 is a case where the offset is 1.

| Cyclic shift field | $n_{DMRS}^{(2)}$ | First layer cyclic shift | Second layer cyclic shift | Third layer cyclic shift | Fourth layer cyclic shift |
|---|---|---|---|---|---|
| 000 | 0 | 0 | 1 | 2 | 3 |
| 001 | 6 | 6 | 7 | 8 | 9 |
| 010 | 3 | 3 | 4 | 5 | 6 |
| 011 | 4 | 4 | 5 | 6 | 7 |
| 100 | 2 | 2 | 3 | 4 | 5 |
| 101 | 8 | 8 | 9 | 10 | 11 |

-continued

| Cyclic shift field | $n_{DMRS}^{(2)}$ | First layer cyclic shift | Second layer cyclic shift | Third layer cyclic shift | Fourth layer cyclic shift |
| --- | --- | --- | --- | --- | --- |
| 110 | 10 | 10 | 11 | 0 | 1 |
| 111 | 9 | 9 | 10 | 11 | 0 |

Table 8 is a case where the offset is 2.

| Cyclic shift field | $n_{DMRS}^{(2)}$ | First layer cyclic shift | Second layer cyclic shift | Third layer cyclic shift | Fourth layer cyclic shift |
| --- | --- | --- | --- | --- | --- |
| 000 | 0 | 0 | 2 | 4 | 6 |
| 001 | 2 | 2 | 4 | 6 | 8 |
| 010 | 3 | 3 | 5 | 7 | 9 |
| 011 | 4 | 4 | 6 | 8 | 10 |
| 100 | 6 | 6 | 8 | 10 | 0 |
| 101 | 8 | 8 | 10 | 0 | 2 |
| 110 | 9 | 9 | 11 | 1 | 3 |
| 111 | 10 | 10 | 0 | 2 | 4 |

Table 9 is a case where the offset is 2.

| Cyclic shift field | $n_{DMRS}^{(2)}$ | First layer cyclic shift | Second layer cyclic shift | Third layer cyclic shift | Fourth layer cyclic shift |
| --- | --- | --- | --- | --- | --- |
| 000 | 0 | 0 | 2 | 4 | 6 |
| 001 | 6 | 6 | 8 | 10 | 0 |
| 010 | 3 | 3 | 5 | 7 | 9 |
| 011 | 4 | 4 | 6 | 8 | 10 |
| 100 | 2 | 2 | 4 | 6 | 8 |
| 101 | 8 | 8 | 10 | 0 | 2 |
| 110 | 10 | 10 | 0 | 2 | 4 |
| 111 | 9 | 9 | 11 | 1 | 3 |

Table 10 is a case where the offset is 3.

| Cyclic shift field | $n_{DMRS}^{(2)}$ | First layer cyclic shift | Second layer cyclic shift | Third layer cyclic shift | Fourth layer cyclic shift |
| --- | --- | --- | --- | --- | --- |
| 000 | 0 | 0 | 3 | 6 | 9 |
| 001 | 2 | 2 | 5 | 8 | 11 |
| 010 | 3 | 3 | 6 | 9 | 0 |
| 011 | 4 | 4 | 7 | 10 | 1 |
| 100 | 6 | 6 | 9 | 0 | 3 |
| 101 | 8 | 8 | 11 | 1 | 4 |
| 110 | 9 | 9 | 0 | 3 | 6 |
| 111 | 10 | 10 | 1 | 4 | 7 |

Table 11 is a case where the offset is 3.

| Cyclic shift field | $n_{DMRS}^{(2)}$ | First layer cyclic shift | Second layer cyclic shift | Third layer cyclic shift | Fourth layer cyclic shift |
| --- | --- | --- | --- | --- | --- |
| 000 | 0 | 0 | 3 | 6 | 9 |
| 001 | 6 | 6 | 9 | 0 | 3 |
| 010 | 3 | 3 | 6 | 9 | 0 |
| 011 | 4 | 4 | 7 | 10 | 1 |
| 100 | 2 | 2 | 5 | 8 | 11 |
| 101 | 8 | 8 | 11 | 1 | 4 |
| 110 | 10 | 10 | 1 | 4 | 7 |
| 111 | 9 | 9 | 0 | 3 | 6 |

Alternatively, a method of continuously allocating the cyclic shift values of the DMRS sequence for the relevant layers of each rank based on $n_{DMRS}^{(2)}$ and the fixed offset, wherein a fixed offset is an offset in the cyclic shift field within the DCI format 0 may be used. A cyclic shift index transmitted from a higher layer may correspond to a cyclic shift field in a one-to-one way. The cyclic shift value of the DMRS sequence for each layer may be determined as $n_{DMRS}^{(2)}$ corresponding to a cyclic shift field index, and the cyclic shift index of the DMRS sequence for each layer has an offset having a constant interval.

For example, assuming that a first layer cyclic shift is index (i), a second layer cyclic shift may be determined as index {(i+offset) mod 8}. Next, a third layer cyclic shift and a fourth layer cyclic shift may be determined as index {(i+2*offset) mod 8} and index {(i+3*offset) mod 8}, respectively. That is, the cyclic shift values of the DMRS sequence for the first layer to the fourth layer may be determined as $n_{DMRS}^{(2)}$ corresponding to cyclic shift indices to which offsets are allocated at constant intervals. $n_{DMRS}^{(2)}$ may be determined by the cyclic shift field within the DCI format 0 transmitted through the PDCCH as described above. The offset may be any one of 1, 2, and 3.

Table 12 to Table 17 illustrate cyclic shift values according to cyclic shift indices and layer indices when the number of layers is 4. For example, in Table 12, if the cyclic shift index is 6 and the offset is 1, a first layer cyclic shift is index (6)=9, and a second layer cyclic shift is index {(i+offset) mod 8}=index (6+1) mod 8}=index (7)=10. Likewise, a third layer cyclic shift is index {(i+2*offset) mod 8}=index (6+2) mod 8}=index (0)=0, and a fourth layer cyclic shift is index {(i+3*offset) mod 8}=index (6+3) mod 8}=index (1)=2.

Table 12 is a case where the offset is 1.

| Cyclic shift index | Cyclic shift field | $n_{DMRS}^{(2)}$ | First layer cyclic shift | Second layer cyclic shift | Third layer cyclic shift | Fourth layer cyclic shift |
|---|---|---|---|---|---|---|
| 0 | 000 | 0 | 0 | 2 | 3 | 4 |
| 1 | 001 | 2 | 2 | 3 | 4 | 6 |
| 2 | 010 | 3 | 3 | 4 | 6 | 8 |
| 3 | 011 | 4 | 4 | 6 | 8 | 9 |
| 4 | 100 | 6 | 6 | 8 | 9 | 10 |
| 5 | 101 | 8 | 8 | 9 | 10 | 0 |
| 6 | 110 | 9 | 9 | 10 | 0 | 2 |
| 7 | 111 | 10 | 10 | 0 | 2 | 3 |

Table 13 is a case where the offset is 1.

| Cyclic shift index | Cyclic shift field | $n_{DMRS}^{(2)}$ | First layer cyclic shift | Second layer cyclic shift | Third layer cyclic shift | Fourth layer cyclic shift |
|---|---|---|---|---|---|---|
| 0 | 000 | 0 | 0 | 2 | 3 | 4 |
| 1 | 001 | 6 | 6 | 8 | 9 | 10 |
| 2 | 010 | 3 | 3 | 4 | 6 | 8 |
| 3 | 011 | 4 | 4 | 6 | 8 | 9 |
| 4 | 100 | 2 | 2 | 3 | 4 | 6 |
| 5 | 101 | 8 | 8 | 9 | 10 | 0 |
| 6 | 110 | 10 | 10 | 0 | 2 | 3 |
| 7 | 111 | 9 | 9 | 10 | 0 | 2 |

Table 14 is a case where the offset is 2.

| Cyclic shift index | Cyclic shift field | $n_{DMRS}^{(2)}$ | First layer cyclic shift | Second layer cyclic shift | Third layer cyclic shift | Fourth layer cyclic shift |
|---|---|---|---|---|---|---|
| 0 | 000 | 0 | 0 | 3 | 6 | 9 |
| 1 | 001 | 2 | 2 | 4 | 8 | 10 |
| 2 | 010 | 3 | 3 | 6 | 9 | 0 |
| 3 | 011 | 4 | 4 | 8 | 10 | 2 |
| 4 | 100 | 6 | 6 | 9 | 0 | 3 |
| 5 | 101 | 8 | 8 | 10 | 2 | 4 |
| 6 | 110 | 9 | 9 | 0 | 3 | 6 |
| 7 | 111 | 10 | 10 | 2 | 4 | 8 |

Table 15 is a case where the offset is 2.

| Cyclic shift index | Cyclic shift field | $n_{DMRS}^{(2)}$ | First layer cyclic shift | Second layer cyclic shift | Third layer cyclic shift | Fourth layer cyclic shift |
|---|---|---|---|---|---|---|
| 0 | 000 | 0 | 0 | 3 | 6 | 9 |
| 1 | 001 | 6 | 6 | 9 | 0 | 3 |
| 2 | 010 | 3 | 3 | 6 | 9 | 0 |
| 3 | 011 | 4 | 4 | 8 | 10 | 2 |
| 4 | 100 | 2 | 2 | 4 | 8 | 10 |
| 5 | 101 | 8 | 8 | 10 | 2 | 4 |
| 6 | 110 | 10 | 10 | 2 | 4 | 8 |
| 7 | 111 | 9 | 9 | 0 | 3 | 6 |

Table 16 is a case where the offset is 3.

| Cyclic shift index | Cyclic shift field | $n_{DMRS}^{(2)}$ | First layer cyclic shift | Second layer cyclic shift | Third layer cyclic shift | Fourth layer cyclic shift |
|---|---|---|---|---|---|---|
| 0 | 000 | 0  | 0  | 4  | 9  | 2  |
| 1 | 001 | 2  | 2  | 6  | 10 | 3  |
| 2 | 010 | 3  | 3  | 8  | 0  | 4  |
| 3 | 011 | 4  | 4  | 9  | 2  | 6  |
| 4 | 100 | 6  | 6  | 10 | 3  | 8  |
| 5 | 101 | 8  | 8  | 0  | 4  | 9  |
| 6 | 110 | 9  | 9  | 2  | 6  | 10 |
| 7 | 111 | 10 | 10 | 3  | 8  | 0  |

Table 17 is a case where the offset is 3.

| Cyclic shift index | Cyclic shift field | $n_{DMRS}^{(2)}$ | First layer cyclic shift | Second layer cyclic shift | Third layer cyclic shift | Fourth layer cyclic shift |
|---|---|---|---|---|---|---|
| 0 | 000 | 0  | 0  | 4  | 9  | 2  |
| 1 | 001 | 6  | 6  | 10 | 3  | 8  |
| 2 | 010 | 3  | 3  | 8  | 0  | 4  |
| 3 | 011 | 4  | 4  | 9  | 2  | 6  |
| 4 | 100 | 2  | 2  | 6  | 10 | 3  |
| 5 | 101 | 8  | 8  | 0  | 4  | 9  |
| 6 | 110 | 10 | 10 | 3  | 8  | 0  |
| 7 | 111 | 9  | 9  | 2  | 6  | 10 |

Alternatively, a method of allocating cyclic shift values so that an interval between the cyclic shift values of the DMRS sequences for respective layers becomes a maximum in the transmission of a plurality of layers may be used. Here, the cyclic shift value of the DMRS sequence for each layer may be determined by the number of layers and $CS_{total}$ that is a total number of possible cyclic shifts. $CS_{total}$ may be any one of 6, 8, and 12.

For example, assuming that $CS_{total}=12$ and the number of layers is 2, when a first layer cyclic shift and a second layer cyclic shift are allocated at an interval of 6, an interval between the cyclic shift values become a maximum. That is, the first layer cyclic shift and the second layer cyclic shift may be any one of {0,6}, {1,7}, {2,8}, {3,9}, {4,10}, {5,11}, {6,0}, {7,1}, {8,2}, {9,3}, {10,4}, and {11,5}. Likewise, if the number of layers is 3, an interval between the cyclic shifts of the DMRS sequences for respective layers may be 4. If the number of layers is 4, an interval between the cyclic shifts of the DMRS sequences for respective layers may be 3. This may be represented by Equation 15.

$$n_{DMRS\_k}^{(2)} = \left\{ n_{DMRS}^{(2)} + \frac{CS_{total}}{\text{the total \# of transmission rank (or layer)}} \cdot (k-1) \right\} \bmod CS_{total}$$

k is a layer index, and $N_{DMRS\_k}^{(2)}$ is the cyclic shift value of a reference signal sequence for a layer having an index k.

If the number of layers is 2 and $CS_{total}=12$ in Equation 15, Equation 16 may be obtained.

$$n_{DMRS\_1}^{(2)} = n_{DMRS}^{(2)},$$

$$n_{DMRS\_2}^{(2)} = \left\{ n_{DMRS}^{(2)} + \frac{CS_{total}}{\text{the total \# of transmission rank (or layer)}} \cdot (k-1) \right\} \bmod$$

-continued $$CS_{total} = \left\{ n_{DMRS}^{(2)} + \frac{12}{2} \cdot (2-1) \right\} \bmod 12 = \{ n_{DMRS}^{(2)} + 6 \} \bmod 12$$

Table 18 is an example of cyclic shift values according to $n_{DMRS}^{(2)}$ of Equation 16 and layer indices.

| Cyclic shift field | $n_{DMRS}^{(2)}$ | First layer cyclic shift | Second layer cyclic shift |
|---|---|---|---|
| 000 | 0  | 0  | 6  |
| 001 | 2  | 2  | 8  |
| 010 | 3  | 3  | 9  |
| 011 | 4  | 4  | 10 |
| 100 | 6  | 6  | 0  |
| 101 | 8  | 8  | 2  |
| 110 | 9  | 9  | 3  |
| 111 | 10 | 10 | 4  |

Table 19 is another example of cyclic shift values according to $n_{DMRS}^{(2)}$ of Equation 16 and layer indices.

| Cyclic shift field | $n_{DMRS}^{(2)}$ | First layer cyclic shift | Second layer cyclic shift |
|---|---|---|---|
| 000 | 0  | 0  | 6  |
| 001 | 6  | 6  | 0  |
| 010 | 3  | 3  | 9  |
| 011 | 4  | 4  | 10 |
| 100 | 2  | 2  | 8  |
| 101 | 8  | 8  | 2  |
| 110 | 10 | 10 | 4  |
| 111 | 9  | 9  | 3  |

If the number of layers is 3 and $CS_{total}=12$ in Equation 15, Equation 17 may be obtained.

$$n^{(2)}_{DMRS\_1} = n^{(2)}_{DMRS},$$
$$n^{(2)}_{DMRS\_k} =$$
$$\left\{n^{(2)}_{DMRS} + \frac{CS_{total}}{\text{the total \# of transmission rank (or layer)}} \cdot (k-1)\right\} \bmod$$
$$CS_{total} = \{n^{(2)}_{DMRS} + 4 \cdot (k-1)\} \bmod 12$$

Table 20 is an example of cyclic shift values according to $n_{DMRS}^{(2)}$ of Equation 17 and layer indices.

| Cyclic shift field | $n_{DMRS}^{(2)}$ | First layer cyclic shift | Second layer cyclic shift | Third layer cyclic shift |
|---|---|---|---|---|
| 000 | 0 | 0 | 4 | 8 |
| 001 | 2 | 2 | 6 | 10 |
| 010 | 3 | 3 | 7 | 11 |
| 011 | 4 | 4 | 8 | 0 |
| 100 | 6 | 6 | 10 | 2 |
| 101 | 8 | 8 | 0 | 4 |
| 110 | 9 | 9 | 1 | 5 |
| 111 | 10 | 10 | 2 | 6 |

Table 21 is another example of cyclic shift values according to $n_{DMRS}^{(2)}$ of Equation 17 and layer indices.

| Cyclic shift field | $n_{DMRS}^{(2)}$ | First layer cyclic shift | Second layer cyclic shift | Third layer cyclic shift |
|---|---|---|---|---|
| 000 | 0 | 0 | 4 | 8 |
| 001 | 6 | 6 | 10 | 2 |
| 010 | 3 | 3 | 7 | 11 |
| 011 | 4 | 4 | 8 | 0 |
| 100 | 2 | 2 | 6 | 10 |
| 101 | 8 | 8 | 0 | 4 |
| 110 | 10 | 10 | 2 | 6 |
| 111 | 9 | 9 | 1 | 5 |

If the number of layers is 4 and $CS_{total}=12$ in Equation 15, Equation 18 may be obtained.

$$n^{(2)}_{DMRS\_1} = n^{(2)}_{DMRS},$$
$$n^{(2)}_{DMRS\_k} =$$
$$\left\{n^{(2)}_{DMRS} + \frac{CS_{total}}{\text{the total \# of transmission rank (or layer)}} \cdot (k-1)\right\} \bmod$$
$$CS_{total} = \{n^{(2)}_{DMRS} + 3 \cdot (k-1)\} \bmod 12$$

Table 22 is an example of cyclic shift values according to $n_{DMRS}^{(2)}$ of Equation 18 and layer indices.

| Cyclic shift field | $n_{DMRS}^{(2)}$ | First layer cyclic shift | Second layer cyclic shift | Third layer cyclic shift | Fourth layer cyclic shift |
|---|---|---|---|---|---|
| 000 | 0 | 0 | 3 | 6 | 9 |
| 001 | 2 | 2 | 5 | 8 | 11 |
| 010 | 3 | 3 | 6 | 9 | 0 |
| 011 | 4 | 4 | 7 | 10 | 1 |
| 100 | 6 | 6 | 9 | 0 | 3 |
| 101 | 8 | 8 | 11 | 2 | 5 |
| 110 | 9 | 9 | 0 | 3 | 6 |
| 111 | 10 | 10 | 1 | 4 | 7 |

Table 23 is another example of cyclic shift values according to $n_{DMRS}^{(2)}$ of Equation 18 and layer indices.

| Cyclic shift field | $n_{DMRS}^{(2)}$ | First layer cyclic shift | Second layer cyclic shift | Third layer cyclic shift | Fourth layer cyclic shift |
|---|---|---|---|---|---|
| 0 | 0 | 3 | 6 | 9 | 9 |
| 6 | 6 | 9 | 0 | 3 | 11 |
| 3 | 3 | 6 | 9 | 0 | 0 |
| 4 | 4 | 7 | 10 | 1 | 1 |
| 2 | 2 | 5 | 8 | 11 | 3 |
| 8 | 8 | 11 | 2 | 5 | 5 |
| 10 | 10 | 1 | 4 | 7 | 6 |
| 9 | 9 | 0 | 3 | 6 | 7 |

In the above embodiment, the method of allocating the cyclic shift value of the DMRS sequence for each layer when the number of layers is plural has been described, but the present invention may be applied to a case where the number of rank is 1 (i.e., a case where a plurality of layers is transmitted according to a transmit diversity scheme). Accordingly, the proposed method of transmitting a reference signal may be applied to the cyclic shift value of the DMRS sequence for each layer. Table 24 shows the number of required cyclic shift values and types of relevant transmit diversity schemes.

| Number of required cyclic shift values | Transmit diversity scheme |
| --- | --- |
| 1 | Preceding vector switching |
|   | CDD (cyclic delay diversity) |
|   | Antenna Selection |
|   | TSTD(Time Switched Transmit Diversity) |
|   | Rank1 preceding |
| 2 | STBC (Space Time Block Code) |
|   | SFBC (Space Frequency Block Code) |
|   | STTC (Space Time Trellis Code) |
|   | SFTC (Space Frequency Trellis Code) |
|   | FSTD (Frequency Switched Transmit Diversity) |
|   | TSTD |
|   | CDD |
|   | STBC/SFBC/STTC/SFTC/FSTD/TDTD + CDD |
|   | ORT (Orthogonal resource transmission) |
| 4 | STBC/SFBC/STTC/SFTC/FSTD/TDTD + FSTD |
|   | FSTD (Frequency Switched Transmit Diversity) |
|   | TSTD |
|   | CDD |

The above method of transmitting a reference signal may be used according to the transmit diversity schemes of Table 24.

Furthermore, in the embodiment, an example where the proposed method of transmitting a reference signal is applied to a DMRS has been described. The proposed method may also be applied to an SRS. If an SRS is transmitted in a multi-antenna system, the above method of transmitting a reference signal may be used. The DMRS is based on $n_{DMRS}^{(2)}$ indicated by the cyclic shift field of the DCI format 0, but the SRS may be based on $n_{SRS}^{cs}$ transmitted to each UE by means of a higher layer.

First, a method of continuously allocating the cyclic shift values of a reference signal sequence to the relevant layers of each rank based on $n_{SRS}^{cs}$ and a fixed offset may be used.

For example, assuming that a first layer cyclic shift is $n_{SRS}^{cs}$, a second layer cyclic shift may be determined as $(n_{SRS}^{cs}+\text{offset}) \mod CS_{total}$. Next, a third layer cyclic shift and a fourth layer cyclic shift may be determined as $(n_{SRS}^{cs}+2*\text{offset}) \mod CS_{total}$ and $(n_{SRS}^{cs}+2*\text{offset}) \mod CS_{total}$, respectively. That is, the first layer to the fourth layer cyclic shift are continuously allocated at a constant interval of an offset. $CS_{total}$ is the total number of possible cyclic shifts and may be any one of 6, 8, and 12. Furthermore, the offset may be any one of 1, 2, and 3.

Table 25 to Table 27 illustrate cyclic shift values according to n SRS$^{cs}$ and layer indices when the number of layers is 4. For example, if $n_{SRS}^{cs}=6$, the offset is 1, and $CS_{total}=8$ in Table 25, a first layer cyclic shift is $n_{SRS}^{cs}=6$, and a second layer cyclic shift is $(n_{SRS}^{cs}+\text{offset}) \mod CS_{total}=(6+1) \mod 8=7$. Likewise, a third layer cyclic shift is $(n_{SRS}^{cs}+2*\text{offset}) \mod CS_{total}=(6+2) \mod 8=0$, and a fourth layer cyclic shift is $(n_{SRS}^{cs}+3*\text{offset}) \mod CS_{total}=(6+3) \mod 8=1$.

Table 25 is a case where the offset is 1.

| $n_{SRS}^{cs}$ | First layer cyclic shift | Second layer cyclic shift | Third layer cyclic shift | Fourth layer cyclic shift |
| --- | --- | --- | --- | --- |
| 0 | 0 | 1 | 2 | 3 |
| 1 | 1 | 2 | 3 | 4 |
| 2 | 2 | 3 | 4 | 5 |
| 3 | 3 | 4 | 5 | 6 |
| 4 | 4 | 5 | 6 | 7 |
| 5 | 5 | 6 | 7 | 0 |
| 6 | 6 | 7 | 0 | 1 |
| 7 | 7 | 0 | 1 | 2 |

Table 26 is a case where the offset is 2.

| $n_{SRS}^{cs}$ | First layer cyclic shift | Second layer cyclic shift | Third layer cyclic shift | Fourth layer cyclic shift |
| --- | --- | --- | --- | --- |
| 0 | 0 | 2 | 4 | 6 |
| 1 | 1 | 3 | 5 | 7 |
| 2 | 2 | 4 | 6 | 0 |
| 3 | 3 | 5 | 7 | 1 |
| 4 | 4 | 6 | 0 | 2 |
| 5 | 5 | 7 | 1 | 3 |
| 6 | 6 | 0 | 2 | 4 |
| 7 | 7 | 1 | 3 | 5 |

Table 27 is a case where the offset is 3.

| $n_{SRS}^{cs}$ | First layer cyclic shift | Second layer cyclic shift | Third layer cyclic shift | Fourth layer cyclic shift |
| --- | --- | --- | --- | --- |
| 0 | 0 | 3 | 6 | 1 |
| 1 | 1 | 4 | 7 | 2 |
| 2 | 2 | 5 | 0 | 3 |
| 3 | 3 | 6 | 1 | 4 |
| 4 | 4 | 7 | 2 | 5 |
| 5 | 5 | 0 | 3 | 6 |
| 6 | 6 | 1 | 4 | 7 |
| 7 | 7 | 2 | 5 | 0 |

Alternatively, a method of continuously allocating the cyclic shift value of a reference signal sequence for each layer based on $n_{SRS}^{cs}$ and a fixed offset, wherein the fixed offset is an offset of an index corresponding to $n_{SRS}^{cs}$ in a one-to-one way may be used. A cyclic shift index transmitted from a higher layer may correspond to $n_{SRS}^{cs}$ in a one-to-one way. The cyclic shift value of the reference signal sequence for each layer may be determined as $n_{SRS}^{cs}$ corresponding to a cyclic shift field index, and the cyclic shift index of the reference signal sequence for each layer has an offset having a constant interval. Table 28 is an example of a corresponding relationship between the cyclic shift index and $n_{SRS}^{cs}$.

| Cyclic shift index | $N_{SRS}^{cs}$ (case 1) | $N_{SRS}^{cs}$ (case 2) | $N_{SRS}^{cs}$ (case 3) |
| --- | --- | --- | --- |
| 0 | 0 | 0 | 0 |
| 1 | 1 | 2 | 6 |
| 2 | 2 | 3 | 3 |
| 3 | 3 | 4 | 4 |
| 4 | 4 | 6 | 2 |
| 5 | 5 | 8 | 8 |
| 6 | 6 | 9 | 10 |
| 7 | 7 | 10 | 9 |

For example, assuming that a first layer cyclic shift is an index (i), a second layer cyclic shift may be determined as index {(i+offset) mod 8}. Next, a third layer cyclic shift and a fourth layer cyclic shift may be determined as index {(i+2*offset) mod 8} and index {(i+3*offset) mod 8}, respectively. That is, the first layer to the fourth layer cyclic shift may be determined as $n_{SRS}^{cs}$ corresponding to a cyclic shift index to which an offset is allocated at a constant interval. The offset may be any one of 1, 2, and 3.

Furthermore, a method of allocating cyclic shift values so that an interval between the cyclic shift values of reference signal sequences for respective layers becomes a maximum may be used. Here, the cyclic shift value of the reference signal sequence for each layer may be determined by the number of layers and $CS_{total}$ that is a total number of possible cyclic shifts. $CS_{total}$ may be any one of 6, 8, and 12.

For example, assuming that $CS_{total}=8$ and the number of layers is 2, when a first layer cyclic shift and a second layer cyclic shift are allocated at an interval of 4, an interval between the cyclic shift values becomes a maximum. That is, the first layer cyclic shift and the second layer cyclic shift may be any one of {0,4}, {1,5}, {2,6}, {3,7}, {4,0}, {5,1}, {6,2}, and {7,3}. Likewise, if the number of layers is 4, an interval between the cyclic shifts of the reference signal sequences for respective layers may be 2. This may be represented by Equation 19.

$$n_{SRS\_k}^{cs} = \left\{n_{SRS}^{cs} + \frac{CS_{total}}{\text{the total \# of transmit antenna}} \cdot (k-1)\right\} \bmod CS_{total}$$

Here, k is a layer index, and $N_{SRS\_k}^{cs}$ is the cyclic shift value of an SRS sequence for the layer index k.

If the number of layers is 2 and $CS_{total}=8$ in Equation 19, Equation 20 may be obtained.

$$n_{SRS\_1}^{cs} = n_{SRS}^{cs},$$

$$n_{SRS\_k}^{cs} = \left\{n_{SRS}^{cs} + \frac{CS_{total}}{\text{the total \# of transmit antenna}} \cdot (k-1)\right\} \bmod CS_{total}$$

$$n_{SRS\_2}^{cs} = \left\{n_{SRS}^{cs} + \frac{8}{2} \cdot (2-1)\right\} \bmod 8$$

$$= \{n_{SRS}^{cs} + 4\} \bmod 8$$

Table 29 is an example of cyclic shift values according to $n_{SRS}^{cs}$ of Equation 20 and layer indices.

| $n_{SRS}^{cs}$ | First layer cyclic shift | Second layer cyclic shift |
|---|---|---|
| 0 | 0 | 4 |
| 1 | 1 | 5 |
| 2 | 2 | 6 |
| 3 | 3 | 7 |
| 4 | 4 | 0 |
| 5 | 5 | 1 |
| 6 | 6 | 2 |
| 7 | 7 | 3 |

If the number of layers is 4 and $CS_{total}=8$ in Equation 19, Equation 21 may be $$n_{SRS\_1}^{cs} = n_{SRS}^{cs},$$

$$n_{SRS\_k}^{cs} = \left\{n_{SRS}^{cs} + \frac{CS_{total}}{\text{the total \# of transmit antenna}} \cdot (k-1)\right\} \bmod CS_{total}$$

-continued $$n_{SRS\_k}^{cs} = \left\{n_{SRS}^{cs} + \frac{8}{4} \cdot (k-1)\right\} \bmod 8$$

$$= \{n_{SRS}^{cs} + 2 \cdot (k-1)\} \bmod 8$$

Table 30 is an example of cyclic shift values according to $n_{SRS}^{cs}$ of Equation 21 and layer indices.

| $n_{SRS}^{cs}$ | First layer cyclic shift | Second layer cyclic shift | Third layer cyclic shift | Fourth layer cyclic shift |
|---|---|---|---|---|
| 0 | 0 | 2 | 4 | 6 |
| 1 | 1 | 3 | 5 | 7 |
| 2 | 2 | 4 | 6 | 0 |
| 3 | 3 | 5 | 7 | 1 |
| 4 | 4 | 6 | 0 | 2 |
| 5 | 5 | 7 | 1 | 3 |
| 6 | 6 | 0 | 2 | 4 |
| 7 | 7 | 1 | 3 | 5 |

Figure 14:
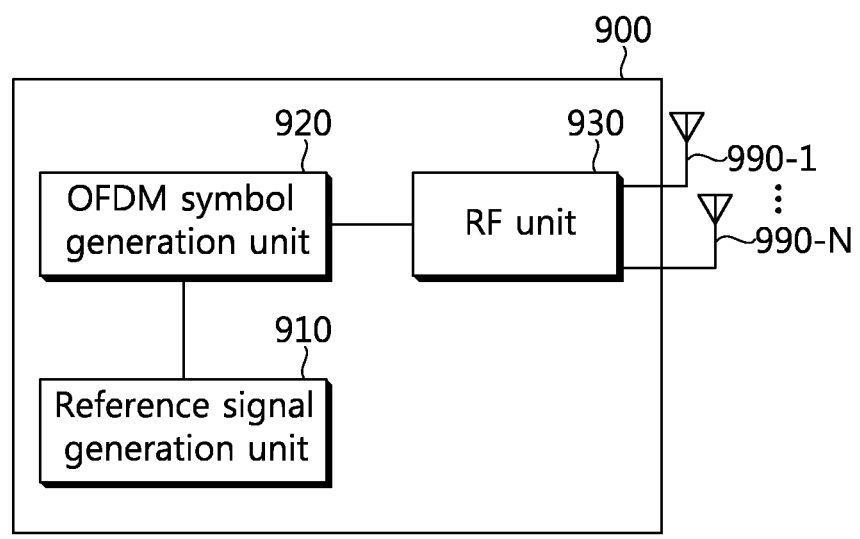
FIG. 14 is a block diagram of a UE in which the embodiments of the present invention are implemented.

FIG. 14 is a block diagram of a UE in which the embodiments of the present invention are implemented.

The UE 900 includes a reference signal generation unit 910, an OFDM symbol generation unit 920, and an RF unit 930. The reference signal generation unit 910 generates a plurality of reference signal sequences to which different cyclic shift values are allocated. The OFDM symbol generation unit 920 is coupled to the reference signal generation unit and configured to generate an OFDM symbol to which the plurality of reference signal sequences is mapped. The RF unit 930 is coupled to the OFDM symbol generation unit and configured to transmit the OFDM symbol to a BS through a plurality of antennas 990-1, . . . , 990-N. A cyclic shift value allocated to each of the reference signal sequences may be determined based on a parameter n indicated by a cyclic shift field transmitted through a PDCCH. The cyclic shift value of the reference signal sequence for each layer in Table 6 to Table 23, Table 25 to Table 27, or Table 29 to Table 30 may be determined by the UE of FIG. 14.

The exemplary embodiments of the present invention may be implemented by hardware, software, or a combination thereof. The hardware may be implemented by an application specific integrated circuit (ASIC), digital signal processing (DSP), a programmable logic device (PLD), a field programmable gate array (FPGA), a processor, a controller, a microprocessor, other electronic units, or a combination thereof, all of which are designed so as to perform the above-mentioned functions. The software may be implemented by a module performing the above-mentioned functions. The software may be stored in a memory unit and may be executed by a processor. The memory unit or a processor may adopt various units well-known to those skilled in the art.

In the above-mentioned exemplary embodiments, the methods are described based on the series of steps or the flow charts shown by a block, but the exemplary embodiments of the present invention are not limited to the order of the steps and any steps may be performed in order different from the above-mentioned steps or simultaneously. In addition, a person skilled in the art to which the present invention pertains may understand that steps shown in the flow chart are not exclusive and thus, may include other steps or one or more step of the flow chart may be deleted without affecting the scope of the present invention.

The above-mentioned embodiments include examples of various aspects. Although all possible combinations showing various aspects are not described, it may be appreciated by those skilled in the art that other combinations may be made. Therefore, the present invention should be construed as including all other substitutions, alterations and modifications belonging to the following claims.

What is claimed is:

1. A method of transmitting a demodulation reference signal (DMRS) for a physical uplink shared channel (PUSCH) in a wireless communication system, the method comprising:
generating first and second DMRS sequences respectively associated with a first and second layer of a plurality of layers consisting of two layers, wherein first and second cyclic shifts are allocated to the first and second DMRS sequences, respectively;
mapping the first and second DMRS sequences to resource elements (REs); and
transmitting the first and second DMRS sequences to a base station,
wherein the first and second cyclic shifts allocated to the first and second DMRS sequences are determined respectively based on a first value and a second value, the first and second values indicated by a common cyclic shift field received through a physical downlink control channel (PDCCH), and
wherein the first and second values are separated by a maximum value corresponding to a total number of possible cyclic shifts.

2. The method of claim 1, wherein a total number of possible first cyclic shifts is 12 and a total number of possible second cyclic shifts is 12.

3. The method of claim 1, wherein the maximum value corresponding to the total number of possible cyclic shifts is 6.

4. The method of claim 1, wherein the cyclic shift field has a length of 3 bits.

5. The method of claim 1, wherein the first value and the second value each correspond to a downlink control information (DCI) format.

6. The method of claim 1,
wherein the first and second DMRS sequences are represented by the following equation:

$$r_{PUSCH}^{(\lambda)}(m \cdot M_{sc}^{RS} + n):$$

where $m = 0, 1$ $n = 0, \ldots, M_{sc}^{RS} - 1$ and $M_{sc}^{RS} = M_{sc}^{PUSCH}$, wherein the plurality of layers is represented by $\lambda \in \{0,1,\ldots,\upsilon-1\}$, with the first layer having a value of $\lambda=0$ and the second layer having a value of $\lambda=1$,
wherein the first and second cyclic shifts are represented by the following equation:
$\alpha_\lambda = 2\pi n_{cs,\lambda}/12$, with the first cyclic shift corresponding to $\lambda=0$ and the second cyclic shift corresponding to $\lambda=1$,
wherein $n_{cs,\lambda} = (n_{DMRS}^{(1)} + n_{DMRS,\lambda}^{(2)} + n_{PN}(n_s))$ mod 12,
wherein values of $n_{DMRS}^{(1)}$ are provided in a first table and values of $n_{DMRS,\lambda}^{(2)}$ are provided in a second table, with $n_{DMRS,\lambda}^{(2)}$ being equal to the first and second values when $\lambda=0$ and $\lambda=1$, respectively, and
wherein $n_{PN}(n_s)$ corresponds to a random sequence.

7. The method of claim 6, wherein the second table comprises:

| | $n_{DMRS,\lambda}^{(2)}$ | |
|---|---|---|
| Z | $\lambda = 0$ | $\lambda = 1$ |
| 000 | 0 | 6 |
| 001 | 6 | 0 |
| 010 | 3 | 9 |
| 011 | 4 | 10 |
| 100 | 2 | 8 |
| 101 | 8 | 2 |
| 110 | 10 | 4 |
| 111 | 9 | 3, | wherein Z is the common cyclic shift field received through the physical downlink control channel (PDCCH).

8. The method of claim 6, wherein the first table comprises:

| cyclicShift | $n_{DMRS}^{(1)}$ |
|---|---|
| 0 | 0 |
| 1 | 2 |
| 2 | 3 |
| 3 | 4 |
| 4 | 6 |
| 5 | 8 |
| 6 | 9 |
| 7 | 10. |

9. A device configured to transmit a demodulation reference signal (DMRS) for a physical uplink shared channel (PUSCH) in a wireless communication system, the device comprising:
a transmitter; and
a controller operatively connected to the transmitter, the controller configured to:
generate first and second DMRS sequences respectively associated with a first and second layer of a plurality of layers consisting of two layers, wherein first and second cyclic shifts are allocated to the first and second DMRS sequences, respectively;
map the first and second DMRS sequences to resource elements (REs); and
transmit the first and second DMRS sequences to a base station,
wherein the first and second cyclic shifts allocated to the first and second DMRS sequences are determined respectively based on a first value and a second value, the first and second values indicated by a common cyclic shift field received through a physical downlink control channel (PDCCH), and
wherein the first and second values are separated by a maximum value corresponding to a total number of possible cyclic shifts.

10. The device of claim 9, wherein a total number of possible first cyclic shifts is 12 and a total number of possible second cyclic shifts is 12.

11. The device of claim 9, wherein the maximum value corresponding to the total number of possible cyclic shifts is 6.

12. The device of claim 9, wherein the cyclic shift field has a length of 3 bits.

13. The device of claim 9, wherein the first value and the second value each correspond to a downlink control information (DCI) format.

14. The device of claim 9,
wherein the first and second DMRS are represented by the following equation:

$r_{PUSCH}^{(\lambda)}(m \cdot M_{sc}^{RS} + n)$:

where $m = 0, 1$ $n = 0, \ldots, M_{sc}^{RS} - 1$ and $M_{sc}^{RS} = M_{sc}^{PUSCH}$, wherein the plurality of layers is represented by $\lambda \in \{0,1,\ldots,\upsilon-1\}$, with the first layer having a value of $\lambda=0$ and the second layer having a value of $\lambda=1$, wherein the first and second cyclic shifts are represented by the following equation: $\alpha_\lambda 2\pi n_{cs,\lambda}/12$, with the first cyclic shift corresponding to $\lambda=0$ and the second cyclic shift corresponding to $\lambda=1$, wherein $n_{cs,\lambda} = (n_{DMRS}^{(1)} + n_{DMRS,\lambda}^{(2)} + n_{PN}(n_s)) \bmod 12$, wherein values of $n_{DMRS}^{(1)}$ are provided in a first table and values of $n_{DMRS,\lambda}^{(2)}$ are provided in a second table, with $n_{DMRS,\lambda}^{(2)}$ being equal to the first and second value when $\lambda=0$ and $\lambda=1$, respectively, and wherein $n_{PN}(n_s)$ corresponds to a random sequence.

15. The device of claim 14, wherein the second table comprises:

|  | $n_{DMRS,\lambda}^{(2)}$ | |
|---|---|---|
| Z | $\lambda = 0$ | $\lambda = 1$ |
| 000 | 0 | 6 |
| 001 | 6 | 0 |
| 010 | 3 | 9 |
| 011 | 4 | 10 |
| 100 | 2 | 8 |
| 101 | 8 | 2 |
| 110 | 10 | 4 |
| 111 | 9 | 3, | wherein Z is the common cyclic shift field received through the physical downlink control channel (PDCCH).

16. The device of claim 14, wherein the first table comprises:

| cyclicShift | $n_{DMRS}^{(1)}$ |
|---|---|
| 0 | 0 |
| 1 | 2 |
| 2 | 3 |
| 3 | 4 |
| 4 | 6 |
| 5 | 8 |
| 6 | 9 |
| 7 | 10. |

17. A method of receiving and processing a demodulation reference signal (DMRS) for a physical uplink shared channel (PUSCH) in a wireless communication system, the method comprising:

receiving and processing first and second DMRS sequences respectively associated with a first and second layer of a plurality of layers consisting of two layers, wherein first and second cyclic shifts are allocated to the first and second DMRS sequences, respectively, wherein the received first and second DMRS sequences are mapped to resource elements (REs), wherein the first and second cyclic shifts allocated to the first and second DMRS sequences are determined respectively based on a first value and a second value, the first and second values indicated by a common cyclic shift field received through a physical downlink control channel (PDCCH), and wherein the first and second values are separated by a maximum value corresponding to a total number of possible cyclic shifts.

18. The method of claim 17, wherein a total number of possible first cyclic shifts is 12 and a total number of possible second cyclic shifts is 12.

19. The method of claim 17, wherein the maximum value corresponding to the total number of possible cyclic shifts is 6.

20. The method of claim 17, wherein the cyclic shift field has a length of 3 bits.

21. The method of claim 17, wherein the first value and the second value each correspond to a downlink control information (DCI) format.

22. The method of claim 17, wherein the first and second DMRS sequences are represented by the following equation:

$r_{PUSCH}^{(\lambda)}(m \cdot M_{sc}^{RS} + n)$:

where $m = 0, 1$ $n = 0, \ldots, M_{sc}^{RS} - 1$ and $M_{sc}^{RS} = M_{sc}^{PUSCH}$, wherein the plurality of layers is represented by $\lambda \in \{0,1,\ldots,\lambda-1\}$, with the first layer having a value of $\lambda=0$ and the second layer having a value of $\lambda=1$, wherein the first and second cyclic shifts are represented by the following equation:

$\alpha_\lambda = 2\pi n_{cs,\lambda}/12$, with the first cyclic shift corresponding to $\lambda=0$ and the second cyclic shift corresponding to $\lambda=1$, wherein $n_{cs,\lambda} = (n_{DMRS}^{(1)} + n_{DMRS,\lambda}^{(2)} + n_{PN}(n_s)) \bmod 12$, wherein values of $n_{DMRS}^{(1)}$ are provided in a first table and values of $n_{DMRS,\lambda}^{(2)}$ are provided in a second table, with $n_{DMRS,\lambda}^{(2)}$ being equal to the first and second values when $\lambda=0$ and $\lambda=1$, respectively, and wherein $n_{PN}(n_s)$ corresponds to a random sequence.

23. The method of claim 22, wherein the second table comprises:

|  | $n_{DMRS,\lambda}^{(2)}$ | |
|---|---|---|
| Z | $\lambda = 0$ | $\lambda = 1$ |
| 000 | 0 | 6 |
| 001 | 6 | 0 |
| 010 | 3 | 9 |
| 011 | 4 | 10 |
| 100 | 2 | 8 |
| 101 | 8 | 2 |
| 110 | 10 | 4 |
| 111 | 9 | 3, | wherein Z is the common cyclic shift field received through the physical downlink control channel (PDCCH).

24. The method of claim 22, wherein the first table comprises:

| cyclicShift | $n_{DMRS}^{(1)}$ |
|---|---|
| 0 | 0 |
| 1 | 2 |
| 2 | 3 |
| 3 | 4 |
| 4 | 6 |
| 5 | 8 |
| 6 | 9 |
| 7 | 10. |

25. A device configured to receive and process a demodulation reference signal (DMRS) for a physical uplink shared channel (PUSCH) in a wireless communication system, the device comprising:
    a receiver; and
    a controller operatively connected to the receiver, the controller configured to:
        receive and process first and second DMRS sequences respectively associated with a first and second layer of a plurality of layers consisting of two layers, wherein a first and second cyclic shifts are allocated to the first and second DMRS sequences, respectively,
    wherein the first and second DMRS sequences are mapped to resource elements (REs),
    wherein the first and second cyclic shifts allocated to the first and second DMRS sequences are determined respectively based on a first value and a second value, the first and second values are indicated by a common cyclic shift field received through a physical downlink control channel (PDCCH), and
    wherein the first and second values are separated by a maximum value corresponding to a total number of possible cyclic shifts.

26. The device of claim 25, wherein a total number of possible first cyclic shifts is 12 and a total number of possible second cyclic shifts is 12.

27. The device of claim 25, wherein the maximum value corresponding to the total number of possible cyclic shifts is 6.

28. The device of claim 25, wherein the cyclic shift field has a length of 3 bits.

29. The device of claim 25, wherein the first value and the second value each correspond to a downlink control information (DCI) format.

30. The device of claim 25,
    wherein the first and second DMRS sequences are represented by the following equation:

$$r_{PUSCH}^{(\lambda)}(m \cdot M_{sc}^{RS} + n):$$

where $m = 0, 1$ $n = 0, \ldots, M_{sc}^{RS} - 1$ and $M_{sc}^{RS} = M_{sc}^{PUSCH}$, wherein the plurality of layers is represented by $\lambda \in \{0, 1, \ldots, \lambda-1\}$, with the first layer having a value of $\lambda=0$ and the second layer having a value of $\lambda=1$, wherein the first and second cyclic shifts are represented by the following equation:

$\alpha_\lambda = 2\pi n_{cs,\lambda}/12$, with the first cyclic shift corresponding to $\lambda=0$ and the second cyclic shift corresponding to $\lambda=1$, wherein $n_{cs,\lambda} = (n_{DMRS}^{(1)} + n_{DMRS,\lambda}^{(2)} + n_{PN}(n_s))$ mod 12, wherein values of $n_{DMRS}^{(1)}$ are provided in a first table and values of $n_{DMRS,\lambda}^{(2)}$ are provided in a second table, with $n_{DMRS,\lambda}^{(2)}$ being equal to the first and second values when $\lambda=0$ and $\lambda=1$, respectively, and wherein $n_{PN}(n_s)$ corresponds to a random sequence.

31. The device of claim 30, wherein the second table comprises:

| | $n_{DMRS,\lambda}^{(2)}$ | |
|---|---|---|
| Z | $\lambda = 0$ | $\lambda = 1$ |
| 000 | 0 | 6 |
| 001 | 6 | 0 |
| 010 | 3 | 9 |
| 011 | 4 | 10 |
| 100 | 2 | 8 |
| 101 | 8 | 2 |
| 110 | 10 | 4 |
| 111 | 9 | 3, | wherein Z is the common cyclic shift field received through the physical downlink control channel (PDCCH).

32. The device of claim 30, wherein the first table comprises:

| cyclicShift | $n_{DMRS}^{(1)}$ |
|---|---|
| 0 | 0 |
| 1 | 2 |
| 2 | 3 |
| 3 | 4 |
| 4 | 6 |
| 5 | 8 |
| 6 | 9 |
| 7 | 10. |

* * * * *